(12) United States Patent
Zhang et al.

(10) Patent No.: US 12,055,685 B2
(45) Date of Patent: Aug. 6, 2024

(54) OPTICAL IMAGING LENS

(71) Applicant: ZHEJIANG SUNNY OPTICS CO., LTD., Zhejiang (CN)

(72) Inventors: Yi Zhang, Zhejiang (CN); Kaiyuan Zhang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

(*) Notice: Subject to any disclaimer, the term of this patent is extended or adjusted under 35 U.S.C. 154(b) by 652 days.

(21) Appl. No.: 17/210,557

(22) Filed: Mar. 24, 2021

(65) Prior Publication Data

US 2021/0302702 A1    Sep. 30, 2021

(30) Foreign Application Priority Data

Mar. 26, 2020    (CN) .......................... 202010222489.2

(51) Int. Cl.
   *G02B 13/00*    (2006.01)
   *G02B 9/64*    (2006.01)
(52) U.S. Cl.
   CPC .......... *G02B 13/0045* (2013.01); *G02B 9/64* (2013.01)

(58) Field of Classification Search
   CPC ....... G02B 13/0045; G02B 9/64; G02B 13/18
   See application file for complete search history.

(56) References Cited

U.S. PATENT DOCUMENTS

| 11,372,215 | B2* | 6/2022 | Nitta ...................... G02B 13/04 |
| 2017/0082835 | A1* | 3/2017 | Tang .................. G02B 13/0045 |
| 2017/0293107 | A1 | 10/2017 | Wang et al. |
| 2018/0180844 | A1 | 6/2018 | Fu |
| 2018/0335609 | A1* | 11/2018 | Chang ................... G02B 13/18 |

OTHER PUBLICATIONS

Corresponding IN application search report issued on Feb. 9, 2022.

* cited by examiner

*Primary Examiner* — Wyatt A Stoffa
*Assistant Examiner* — Ray Alexander Dean
(74) *Attorney, Agent, or Firm* — Samson G. Yu

(57) ABSTRACT

The disclosure discloses an optical imaging lens, which sequentially includes, from an object side to an image side along an optical axis, a first lens, a second lens, a third lens, a fourth lens, a fifth lens, a sixth lens and a seventh lens. The first lens has positive refractive power, the fourth lens has positive refractive power, and the seventh lens has negative refractive power. A total effective focal length f of the optical imaging lens and a maximum Field Of View (FOV) of the optical imaging lens meet f×tan(FOV/2)?5.5 mm. An effective focal length f4 of the fourth lens and an effective focal length f6 of the sixth lens meet 1.3≤f4/f6<4.5.

15 Claims, 18 Drawing Sheets

OPTICAL IMAGING LENS

CROSS-REFERENCE TO RELATED DISCLOSURE(S)

The disclosure claims priority to and the benefit of Chinese Patent Disclosure No. 202010222489.2, filed in the China National Intellectual Property Administration (CNIPA) on 26 Mar. 2020, which is incorporated herein by reference in its entirety.

TECHNICAL FIELD

The disclosure relates to the field of optical elements, and more particularly to an optical imaging lens.

BACKGROUND

With the upgrading and updating of consumer electronic devices and the development of image software functions and video software functions in consumer electronic products, camera modules have usually been arranged in portable devices such as mobile phones and tablet computers to endow the portable devices with camera functions. In a camera module, a Charge-Coupled Device (CCD) type image sensor or a Complementary Metal Oxide Semiconductor (CMOS) type image sensor is usually arranged, and an optical imaging lens is also arranged. The optical imaging lens may converge light of an object side, imaged light follows a light path of the optical imaging lens and irradiates the image sensor, and furthermore, the image sensor converts an optical signal into an electric signal to form image data.

With the enhancement of a trend of development of portable devices to light and thin designs and the constant performance improvement and size reduction of fittings such as an image sensor, higher requirements have also been made to high imaging quality and miniaturization of matched imaging lenses.

For meeting a miniaturization requirement and an imaging requirement, an optical imaging lens that achieves an ultra-large image surface, an ultra-thin design and a large aperture or high imaging quality on the basis of considering a miniaturization feature is required.

SUMMARY

Some embodiments of the disclosure provide an optical imaging lens applicable to a portable electronic product and capable of at least overcoming or partially overcoming at least one shortcoming in a related art.

One embodiment of the disclosure provides an optical imaging lens, which sequentially includes, from an object side to an image side along an optical axis, a first lens, a second lens, a third lens, a fourth lens, a fifth lens, a sixth lens and a seventh lens. The first lens has positive refractive power, the fourth lens has positive refractive power, and the seventh lens has negative refractive power. A total effective focal length f of the optical imaging lens and a maximum Field Of View (FOV) of the optical imaging lens meet f×tan(FOV/2)≥5.5 mm. An effective focal length f4 of the fourth lens and an effective focal length f6 of the sixth lens meet 1.3≤f4/f6<4.5.

In an implementation mode, an object-side surface of the first lens to an image-side surface of the seventh lens include at least one aspherical mirror surface.

In an implementation mode, the total effective focal length f of the optical imaging lens and a center thickness CT6 of the sixth lens on the optical axis meet 9≤f/CT6<15.

In an implementation mode, the total effective focal length f of the optical imaging lens and a curvature radius R8 of an image-side surface of the fourth lens meet −1.5<f/R8<0.

In an implementation mode, the total effective focal length f of the optical imaging lens and a curvature radius R5 of an object-side surface of the third lens meet −1.0<f/R5<0.1.

In an implementation mode, the total effective focal length f of the optical imaging lens and an effective focal length f1 of the first lens meet 1<f/f1≤1.3.

In an implementation mode, an effective focal length f2 of the second lens and an effective focal length f7 of the seventh lens meet 1.5<f2/f7<3.2.

In an implementation mode, the total effective focal length f of the optical imaging lens, an effective focal length f3 of the third lens and an effective focal length f5 of the fifth lens meet 0.2≤f/|f3|+f/|f5|≤0.5.

In an implementation mode, a refractive index N4 of the fourth lens, a refractive index N5 of the fifth lens and a refractive index N6 of the sixth lens meet 1.5<(N4+N5+N6)/3≤1.6; and an Abbe number V5 of the fifth lens and an Abbe number V6 of the sixth lens meet 15<V6−V5≤20.

In an implementation mode, the total effective focal length f of the optical imaging lens, a curvature radius R1 of the object-side surface of the first lens and a curvature radius R2 of an image-side surface of the first lens meet 0.5≤f/(R2−R1)≤1.0.

In an implementation mode, a curvature radius R3 of an object-side surface of the second lens and a curvature radius R4 of an image-side surface of the second lens meet 2.0<(R3+R4)/(R3−R4)<4.0.

In an implementation mode, the total effective focal length f of the optical imaging lens, a curvature radius R9 of an object-side surface of the fifth lens and a curvature radius R10 of an image-side surface of the fifth lens meet −1.0<f/R9−f/R10<0.

In an implementation mode, a curvature radius R11 of an object-side surface of the sixth lens and a curvature radius R12 of an image-side surface of the sixth lens meet 0.9≤R12/R11<4.0.

In an implementation mode, a separation distance T34 of the third lens and the fourth lens on the optical axis and a separation distance T45 of the fourth lens and the fifth lens on the optical axis meet T34/T45≤0.5; and the separation distance T45 of the fourth lens and the fifth lens on the optical axis and a separation distance T56 of the fifth lens and the sixth lens on the optical axis meet 0.5<T45/T56<3.0.

In an implementation mode, the total effective focal length f of the optical imaging lens and the effective focal length f2 of the second lens meet −0.6≤f/f2≤−0.4.

In an implementation mode, the total effective focal length f of the optical imaging lens and the effective focal length f7 of the seventh lens meet −1.3≤f/f7≤−1.0.

In an implementation mode, TTL is a distance from the object-side surface of the first lens to an imaging surface of the optical imaging lens on the optical axis and ImgH is a half of a diagonal length of an effective pixel region on the imaging surface meet TTL/ImgH<1.5.

Another embodiment of the disclosure provides an optical imaging lens, which sequentially includes, from an object side to an image side along an optical axis, a first lens, a second lens, a third lens, a fourth lens, a fifth lens, a sixth lens and a seventh lens. The first lens has positive refractive power, the fourth lens has positive refractive power, and the seventh lens has negative refractive power. A total effective focal length f of the optical imaging lens and a maximum FOV of the optical imaging lens meet f×tan(FOV/2)≥5.5 mm. The total effective focal length f of the optical imaging lens and an effective focal length f1 of the first lens meet 1<f/f1≤1.3.

In an implementation mode, an object-side surface of the first lens to an image-side surface of the seventh lens include at least one aspherical mirror surface.

In an implementation mode, the total effective focal length f of the optical imaging lens and a center thickness CT6 of the sixth lens on the optical axis meet 9≤f/CT6<15.

In an implementation mode, the total effective focal length f of the optical imaging lens and a curvature radius R8 of an image-side surface of the fourth lens meet −1.5<f/R8<0.

In an implementation mode, the total effective focal length f of the optical imaging lens and a curvature radius R5 of an object-side surface of the third lens meet −1.0<f/R5<0.1.

In an implementation mode, an effective focal length f4 of the fourth lens and an effective focal length f6 of the sixth lens meet 1.3≤f4/f6<4.5.

In an implementation mode, an effective focal length f2 of the second lens and an effective focal length f7 of the seventh lens meet 1.5<f2/f7<3.2.

In an implementation mode, the total effective focal length f of the optical imaging lens, an effective focal length f3 of the third lens and an effective focal length f5 of the fifth lens meet 0.2≤|f3|+f/|f5|≤0.5.

In an implementation mode, a refractive index N4 of the fourth lens, a refractive index N5 of the fifth lens and a refractive index N6 of the sixth lens meet 1.5<(N4+N5+N6)/3≤1.6; and an Abbe number V5 of the fifth lens and an Abbe number V6 of the sixth lens meet 15<V6−V5≤20.

In an implementation mode, the total effective focal length f of the optical imaging lens, a curvature radius R1 of the object-side surface of the first lens and a curvature radius R2 of an image-side surface of the first lens meet 0.5≤f/(R2−R1)≤1.0.

In an implementation mode, a curvature radius R3 of an object-side surface of the second lens and a curvature radius R4 of an image-side surface of the second lens meet 2.0<(R3+R4)/(R3−R4)<4.0.

In an implementation mode, the total effective focal length f of the optical imaging lens, a curvature radius R9 of an object-side surface of the fifth lens and a curvature radius R10 of an image-side surface of the fifth lens meet −1.0<f/R9−f/R10<0.

In an implementation mode, a curvature radius R11 of an object-side surface of the sixth lens and a curvature radius R12 of an image-side surface of the sixth lens meet 0.9≤R12/R11<4.0.

In an implementation mode, a separation distance T34 of the third lens and the fourth lens on the optical axis and a separation distance T45 of the fourth lens and the fifth lens on the optical axis meet T34/T45≤0.5; and the separation distance T45 of the fourth lens and the fifth lens on the optical axis and a separation distance T56 of the fifth lens and the sixth lens on the optical axis meet 0.5<T45/T56<3.0.

In an implementation mode, the total effective focal length f of the optical imaging lens and the effective focal length f2 of the second lens meet −0.6≤f/f2≤−0.4.

In an implementation mode, the total effective focal length f of the optical imaging lens and the effective focal length f7 of the seventh lens meet −1.3≤f/f7≤−1.0.

In an implementation mode, TTL is a distance from the object-side surface of the first lens to an imaging surface of the optical imaging lens on the optical axis and ImgH is a half of a diagonal length of an effective pixel region on the imaging surface meet TTL/ImgH<1.5.

According to the disclosure, the seven lenses are adopted, and the refractive power and surface types of each lens, a center thickness of each lens, on-axis distances between the lenses and the like are reasonably configured to achieve at least one beneficial effect of ultra-large image surface, ultra-thin design, large aperture, high imaging quality and the like of the optical imaging lens.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
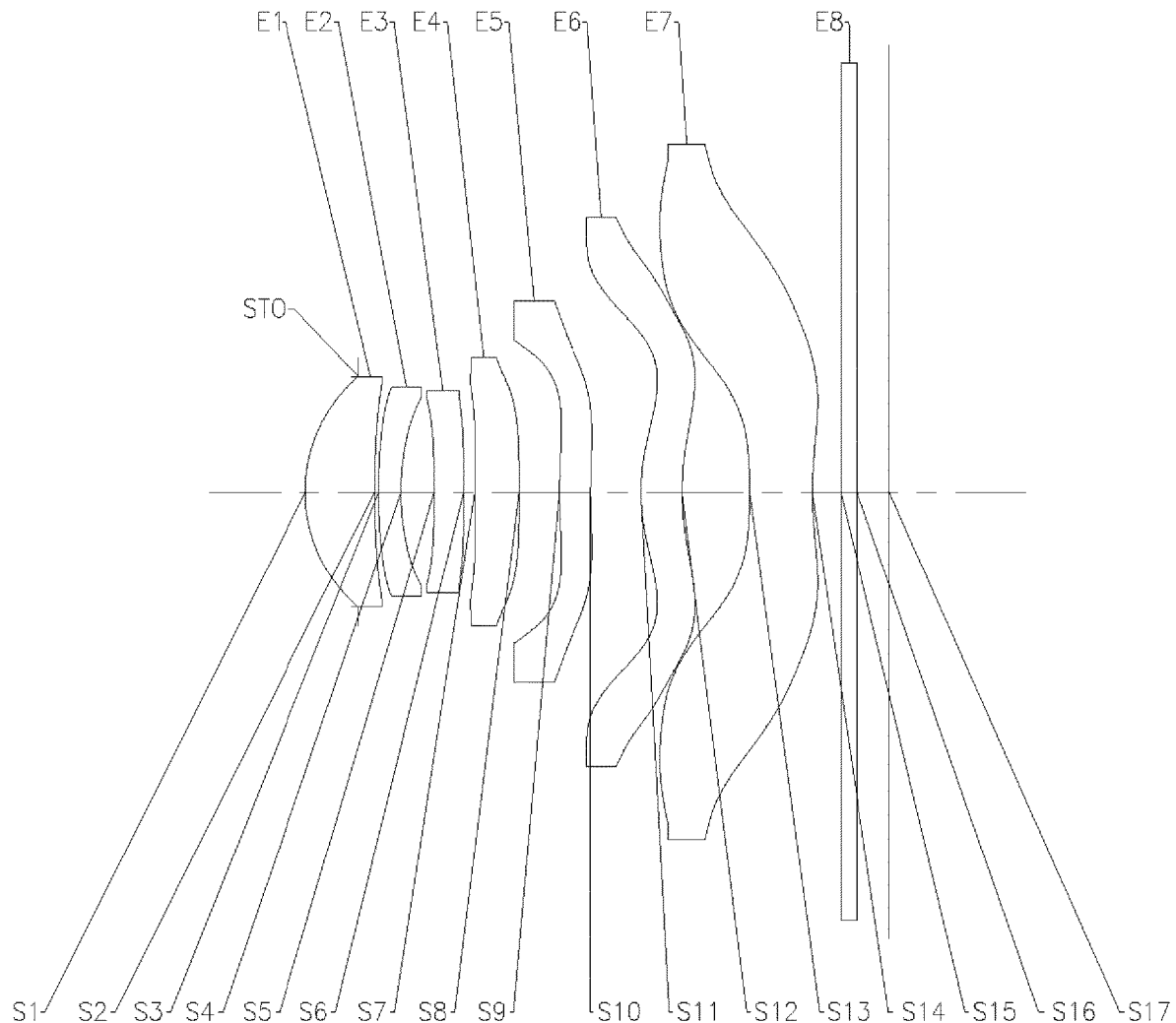
FIG. 1 shows a structure diagram of an optical imaging lens according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspherical shape shown in the drawings is shown by some embodiments. That is, the spherical shape or the aspherical shape is not limited to the spherical shape or aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens according to an exemplary implementation mode of the disclosure may include, for example, seven lenses with refractive power, i.e., a first lens, a second lens, a third lens, a fourth lens, a fifth lens, a sixth lens and a seventh lens. The seven lenses are sequentially arranged from an object side to an image side along an optical axis. In the first lens to the seventh lens, there may be an air space between any two adjacent lenses.

In the exemplary implementation mode, the first lens may have positive refractive power; the second lens has positive refractive power or negative refractive power; the third lens has positive refractive power or negative refractive power; the fourth lens may have positive refractive power; the fifth lens has positive refractive power or negative refractive power; the sixth lens has positive refractive power or negative refractive power; and the seventh lens may have negative positive power. The refractive power of each component of the lens is reasonably controlled to be positive or negative to effectively balance and control lower-order aberrations of the lens and ensure that each lens is easy to machine by injection molding and may be assembled with relatively high yield.

In the exemplary implementation mode, the optical imaging lens of the disclosure may meet a conditional expression f×tan(FOV/2)≥5.5 mm, wherein f is a total effective focal length of the optical imaging lens, and FOV is a maximum FOV of the optical imaging lens. The conditional expression may be controlled to control the total effective focal length and the maximum FOV well and further achieve high imaging quality and relatively low sensitivity of the optical imaging lens. More specifically, f and FOV may meet 5.7 mm<f×tan(FOV/2)<6.5 mm.

In the exemplary implementation mode, the optical imaging lens of the disclosure may meet a conditional expression 1.3≤f4|f6<4.5, wherein f4 is an effective focal length of the fourth lens, and f6 is an effective focal length of the sixth lens. A ratio of the effective focal length of the fourth lens to the effective focal length of the sixth lens may be restricted to restrict contributions of spherical aberrations of the two lenses and contributions of comas thereof well and ensure that the sensitivity is at a reasonable level after balancing. More specifically, f4 and f6 may meet 1.35≤f4/f6<4.10.

In the exemplary implementation mode, the optical imaging lens of the disclosure may meet a conditional expression 9≤f/CT6<15, wherein f is the total effective focal length of the optical imaging lens, and CT6 is a center thickness of the sixth lens on the optical axis. A ratio of the total effective focal length to the center thickness of the sixth lens may be controlled to maintain high imaging quality of the optical imaging lens and simultaneously ensure the structural feasibility and high machinability of each lens. More specifically, f and CT6 may meet 9.05≤f/CT6<12.70.

In the exemplary implementation mode, the optical imaging lens of the disclosure may meet a conditional expression −1.5<f/R8<0, wherein f is the total effective focal length of the optical imaging lens, and R8 is a curvature radius of an image-side surface of the fourth lens. A ratio of the total effective focal length to the curvature radius of the image-side surface of the fourth lens is controlled to control a field curvature contribution of the image-side surface in a reasonable range and balance a field curvature generated by the lens in an image-side direction thereof. More specifically, f and R8 may meet −1.1<f/R8<0.1.

In the exemplary implementation mode, the optical imaging lens of the disclosure may meet a conditional expression −1.0<f/R5<0.1, wherein f is the total effective focal length of the optical imaging lens, and R5 is a curvature radius of an object-side surface of the third lens. A ratio of the total effective focal length to the curvature radius of the object-side surface of the third lens is controlled to control a field curvature contribution of the object-side surface in a reasonable range to further balance a field curvature generated by the lens in an image-side direction thereof. More specifically, f and R5 may meet −0.80<f/R5<0.08.

In the exemplary implementation mode, the optical imaging lens of the disclosure may meet a conditional expression 1<f/f1≤1.3, wherein f is the total effective focal length of the optical imaging lens, and f1 is an effective focal length of the first lens. A range of a ratio of the total effective focal length to the effective focal length of the first lens may be restricted to ensure that the first lens is matched with an optical component with negative refractive power in an image-side direction thereof as an optical component with reasonable positive refractive power to balance aberrations generated by them to further achieve high imaging quality. More specifically, f and f1 may meet 1.10<f/f1≤1.29.

In the exemplary implementation mode, the optical imaging lens of the disclosure may meet a conditional expression 1.5<f2/f7<3.2, wherein f2 is an effective focal length of the second lens, and f7 is an effective focal length of the seventh lens. A ratio of the effective focal length of the second lens to the effective focal length of the seventh lens may be restricted to restrict contributions of spherical aberrations of the two lenses and contributions of comas of the two lenses reasonably and ensure that the sensitivities of the two lenses are at reasonable levels after balancing therebetween. More specifically, f2 and f7 may meet 1.9<f2/f7<3.1.

In the exemplary implementation mode, the optical imaging lens of the disclosure may meet a conditional expression 0.2≤f/|f3|+f/|f5|≤0.5, wherein f is the total effective focal length of the optical imaging lens, f3 is an effective focal length of the third lens, and f5 is an effective focal length of the fifth lens. A range of the conditional expression may be controlled to ensure that the two lenses contribute negative third-order spherical aberrations and positive fifth-order spherical aberrations reasonably and balance positive third-order spherical aberrations and negative fifth-order spherical aberrations generated by the third lens and the fourth lens to further make a spherical aberration of the optical imaging lens relatively low and ensure high imaging quality in an on-axis FOV.

In the exemplary implementation mode, the optical imaging lens of the disclosure may meet a conditional expression 1.5<(N4+N5+N6)/3≤1.6, wherein N4 is a refractive index of the fourth lens, N5 is a refractive index of the fifth lens, and N6 is a refractive index of the sixth lens. Exemplarily, the optical imaging lens of the disclosure may meet a conditional expression 15<V6−V5≤20, wherein V5 is an Abbe number of the fifth lens, and V6 is an Abbe number of the sixth lens. The two conditional expressions may be controlled to ensure relatively low refractive indexes of the fourth lens, the fifth lens and the sixth lens and simultaneously ensure that the Abbe numbers differ greatly, so that a longitudinal chromatic aberration, axial chromatic aberration and spherochromatic aberration of the optical imaging lens may be corrected intensively, and the image quality of the optical imaging lens may further be ensured well. More specifically, V5 and V6 may meet 18<V6−V5≤19.

In the exemplary implementation mode, the optical imaging lens of the disclosure may meet a conditional expression 0.5≤f/(R2−R1)≤1.0, wherein f is the total effective focal length of the optical imaging lens, R1 is a curvature radius of an object-side surface of the first lens, and R2 is a curvature radius of an image-side surface of the first lens. Controlling a ratio of the total effective focal length to the curvature radii of the two mirror surfaces of the first lens is favorable for controlling a field curvature contribution of the object-side surface of the first lens in a reasonable range to achieve a balance with a field curvature generated by the lens in an image-side direction of the first lens.

In the exemplary implementation mode, the optical imaging lens of the disclosure may meet a conditional expression 2.0<(R3+R4)/(R3−R4)<4.0, wherein R3 is a curvature radius of an object-side surface of the second lens, and R4 is a curvature radius of an image-side surface of the second lens. The curvature radii of the two mirror surfaces of the second lens may be matched to control the coma contribution thereof in a reasonable range to further avoid obvious degradation of the image quality of the optical imaging lens in an on-axis FOV and an off-axis FOV due to the coma contribution. More specifically, R3 and R4 may meet 2.30<(R3+R4)/(R3−R4)<3.80.

In the exemplary implementation mode, the optical imaging lens of the disclosure may meet a conditional expression −1.0<f/R9−f/R10<0, wherein f is the total effective focal length of the optical imaging lens, R9 is a curvature radius of an object-side surface of the fifth lens, and R10 is a curvature radius of an image-side surface of the fifth lens. The curvature radii of the two mirror surfaces of the fifth lens and the total effective focal length may be controlled to be matched to control a contribution rate of third-order astigmatism of the fifth lens to a certain extent to control the third-order astigmatism of the fifth lens in a reasonable range to achieve the effects of a macro mode and high resolving power of the optical imaging lens. More specifically, f, R9 and R10 may meet −0.75<f/R9−f/R10<−0.10.

In the exemplary implementation mode, the optical imaging lens of the disclosure may meet a conditional expression 0.9≤R12/R11<4.0, wherein R11 is a curvature radius of an object-side surface of the sixth lens, and R12 is a curvature radius of an image-side surface of the sixth lens. A range of a ratio of the curvature radius of the image-side surface of the sixth lens to the curvature radius of the object-side surface thereof may be restricted to restrict the shape of the sixth lens effectively to further control aberration contribution rates of the two mirror surfaces of the sixth lens effectively to balance an aperture band related aberration of the optical imaging lens effectively and further improve the imaging quality of the optical imaging lens effectively. More specifically, R11 and R12 may meet 0.91≤R12/R11<3.60.

In the exemplary implementation mode, the optical imaging lens of the disclosure may meet a conditional expression T34/T45≤0.5, wherein T34 is a separation distance of the third lens and the fourth lens on the optical axis, and T45 is a separation distance of the fourth lens and the fifth lens on the optical axis. Restricting a ratio of an air space of the third lens and the fourth lens on the optical axis to an air space of the fourth lens and the fifth lens on the optical axis is favorable for ensuring the structural feasibility and high machinability of these lenses. More specifically, T34 and T45 may meet 0.1≤T34/T45≤0.5.

Exemplarily, the optical imaging lens of the disclosure may meet a conditional expression 0.5<T45/T56<3.0, wherein T45 is the separation distance of the fourth lens and the fifth lens on the optical axis, and T56 is a separation distance of the fifth lens and the sixth lens on the optical axis. Restricting a ratio of the air space of the fourth lens and the fifth lens on the optical axis to an air space of the fifth lens and the sixth lens on the optical axis is favorable for ensuring the structural feasibility and high machinability of these lenses. More specifically, T45 and T56 may meet 0.7<T45/T56<2.7

In the exemplary implementation mode, the optical imaging lens of the disclosure may meet a conditional expression −0.65≤f/f2≤−0.4, wherein f is the total effective focal length of the optical imaging lens, and f2 is the effective focal length of the second lens. A ratio of the total effective focal length to the effective focal length of the second lens may be controlled to restrict a positive spherical aberration generated by the second lens in a reasonable interval and counterbalance the positive spherical aberration and a negative spherical aberration generated by the first lens rapidly to further achieve high imaging quality in the on-axis FOV and an adjacent FOV thereof.

In the exemplary implementation mode, the optical imaging lens of the disclosure may meet a conditional expression $-1.35 \leq f/f7 \leq -1.0$, wherein f is the total effective focal length of the optical imaging lens, and f7 is the effective focal length of the seventh lens. A range of a ratio of the total effective focal length to the effective focal length of the seventh lens may be restricted to balance an aberration generated by the seventh lens that serves as an optical component with reasonable negative refractive power and an aberration generated by a group of optical components with positive refractive power in an object-side direction thereof to achieve the purposes of reducing the aberration of the optical imaging lens and improving the imaging quality.

In the exemplary implementation mode, the optical imaging lens of the disclosure may meet a conditional expression TTL/ImgH<1.5, wherein TTL is a distance from the object-side surface of the first lens to an imaging surface of the optical imaging lens on the optical axis, and ImgH is a half of a diagonal length of an effective pixel region on the imaging surface. A ratio of a total optical length to an image height may be controlled to reduce the total side of the optical imaging lens effectively and achieve an ultra-thin feature and miniaturization of the optical imaging lens, so that the optical imaging lens may be applied to more and more ultra-thin electronic products on the market better. More specifically, TTL and ImgH may meet 1.15<TTL/ImgH<1.35.

In the exemplary implementation mode, the optical imaging lens may further include at least one diaphragm. The diaphragm may be arranged at a proper position as required, for example, arranged between the object side and the first lens. Optionally, the optical imaging lens may further include an optical filter configured to correct a chromatic aberration and/or protective glass configured to protect a photosensitive element on the imaging surface.

The optical imaging lens according to the implementation mode of the disclosure may adopt seven lenses, for example, the abovementioned seven. The refractive power and surface types of each lens, a center thickness of each lens, on-axis distances between the lenses and the like are reasonably configured to effectively reduce the size of the imaging lens, reduce the sensitivity of the imaging lens, improve the machinability of the imaging lens and ensure that the optical imaging lens is more favorable for production and machining and applicable to a portable electronic product. In addition, the optical imaging lens of the disclosure also has high optical performance such as an ultra-large image surface, an ultra-thin design, a large aperture and high imaging quality.

In the implementation mode of the disclosure, at least one of mirror surfaces of each lens is an aspherical mirror surface, namely at least one of the object-side surface of the first lens to an image-side surface of the seventh lens is an aspherical mirror surface. An aspherical lens has a characteristic that a curvature keeps changing from a center of the lens to a periphery of the lens. Unlike a spherical lens with a constant curvature from a center of the lens to a periphery of the lens, the aspherical lens has a better curvature radius characteristic and the advantages of improving distortions and improving astigmatic aberrations. With adoption of the aspherical lens, the astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens and the seventh lens is an aspherical mirror surface. Optionally, both the object-side surface and image-side surface of each lens in the first lens, the second lens, the third lens, the fourth lens, the fifth lens, the sixth lens and the seventh lens are aspherical mirror surfaces.

However, those skilled in the art should know that the number of the lenses forming the optical imaging lens may be changed without departing from the technical solutions claimed in the disclosure to achieve each result and advantage described in the specification. For example, although descriptions are made in the implementation with seven lenses as an example, the optical imaging lens is not limited to seven lenses. If necessary, the optical imaging lens may further include another number of lenses.

Specific embodiments of the optical imaging lens applied to the abovementioned implementation mode will further be described below with reference to the drawings.

Embodiment 1

An optical imaging lens according to embodiment 1 of the disclosure will be described below with reference to FIG. 1 to FIG. 2D. FIG. 1 shows a structure diagram of an optical imaging lens according to embodiment 1 of the disclosure.

As shown in FIG. 1, the optical imaging lens sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a concave surface, and an image-side surface S6 is a convex surface. The fourth lens E4 has positive refractive power, an object-side surface S7 thereof is a concave surface, and an image-side surface S8 is a convex surface. The fifth lens E5 has positive refractive power, an object-side surface S9 thereof is a concave surface, while an image-side surface S10 is a convex surface. The sixth lens E6 has positive refractive power, an object-side surface S11 thereof is a concave surface, while an image-side surface S12 is a convex surface. The seventh lens E7 has negative refractive power, an object-side surface S13 thereof is a concave surface, and an image-side surface S14 is a concave surface. The optical filter E8 has an object-side surface S15 and an image-side surface S16. The optical imaging lens has an imaging surface S17. Light from an object sequentially penetrates through each of the surfaces S1 to S16 and is finally imaged on the imaging surface S17.

Table 1 is a basic parameter table of the optical imaging lens of embodiment 1, and units of the curvature radius, the thickness/distance and the focal length are all millimeter (mm)

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6850 | | | | |
| S1 | Aspherical | 2.3193 | 0.9000 | 1.546 | 56.11 | 5.19 | −0.0108 |
| S2 | Aspherical | 13.1178 | 0.0515 | | | | 15.1358 |
| S3 | Aspherical | 6.7331 | 0.2901 | 1.678 | 19.25 | −12.40 | 0.0000 |
| S4 | Aspherical | 3.5877 | 0.4284 | | | | 0.0000 |
| S5 | Aspherical | −9.3507 | 0.3817 | 1.678 | 19.25 | −43.07 | 0.0000 |
| S6 | Aspherical | −17.7650 | 0.1461 | | | | 0.0000 |
| S7 | Aspherical | −27.7063 | 0.5729 | 1.546 | 56.11 | 32.0294 | 0.0000 |
| S8 | Aspherical | −6.4090 | 0.5210 | | | | 0.0000 |
| S9 | Aspherical | −4.3038 | 0.4100 | 1.570 | 37.32 | 81.1355 | 0.0000 |
| S10 | Aspherical | −8.0811 | 0.6505 | | | | 0.0000 |
| S11 | Aspherical | −9.8694 | 0.5300 | 1.546 | 56.11 | 17.5191 | 0.0000 |
| S12 | Aspherical | −9.8550 | 0.8759 | | | | 0.8054 |
| S13 | Aspherical | −11.7165 | 0.8100 | 1.536 | 55.74 | −6.3059 | 0.0000 |
| S14 | Aspherical | 5.4470 | 0.3729 | | | | 0.1213 |
| S15 | Spherical | Infinite | 0.2100 | 1.517 | 64.17 | | |
| S16 | Spherical | Infinite | 0.4190 | | | | |
| S17 | Spherical | Infinite | | | | | |

In embodiment 1, a value of a total effective focal length f of the optical imaging lens is 6.70 mm, and a value of a maximum FOV is 86.6 g.

In embodiment 1, both the object-side surface and image-side surface of any lens in the first lens E1 to the seventh lens E7 are aspherical surfaces, and a surface type x of each aspherical lens may be defined through, but not limited to, the following aspherical surface formula:

$$x = \frac{ch^2}{1+\sqrt{1-(k+1)c^2h^2}} + \sum Aih^i, \quad (1)$$

wherein x is a distance vector height from a vertex of the aspherical surface when the aspherical surface is at a height of h along the optical axis direction; c is a paraxial curvature of the aspherical surface, c=1/R (namely, the paraxial curvature c is a reciprocal of the curvature radius R in Table 1); k is a cone coefficient; and Ai is a correction coefficient of the i-th order of the aspherical surface. Table 2 shows high-order coefficients $A_4$, $A_6$, $A_8$, $A_{10}$, $A_{12}$, $A_{14}$, $A_{16}$, $A_{18}$ and $A_{20}$ applied to each of the aspherical mirror surfaces S1-S14 in embodiment 1.

TABLE 2

| Surface number | A4 | A6 | A8 | A10 | A12 | A14 | A16 | A18 | A20 |
|---|---|---|---|---|---|---|---|---|---|
| S1 | −8.4271E−03 | −1.6373E−03 | 1.4022E−03 | −5.1051E−04 | 1.5227E−04 | −5.1006E−05 | 2.1046E−05 | −6.6965E−06 | 5.2334E−06 |
| S2 | −2.0807E−02 | 3.5852E−03 | 1.1982E−03 | 1.2762E−03 | 2.6435E−04 | 2.9637E−04 | −5.0860E−05 | 7.3553E−05 | −1.3804E−05 |
| S3 | −9.6169E−02 | 2.1992E−02 | −3.6468E−03 | 2.7382E−03 | −1.4150E−04 | 4.1701E−04 | −1.0682E−04 | 8.3109E−05 | −2.1289E−05 |
| S4 | −5.9474E−02 | 1.1641E−02 | −2.8163E−03 | 1.5481E−03 | −4.5618E−04 | 2.7761E−04 | −1.2172E−04 | 5.8302E−05 | −1.5282E−05 |
| S5 | 6.5631E−02 | 3.7679E−03 | −1.8356E−03 | 5.0585E−04 | −1.1830E−04 | 1.1111E−04 | −6.8334E−05 | 3.1712E−05 | −9.3756E−06 |
| S6 | −2.7204E−02 | 4.3034E−02 | −1.0201E−02 | 1.3290E−03 | 9.4051E−05 | 1.0239E−04 | −7.3964E−05 | 5.0447E−05 | −1.5216E−05 |
| S7 | −6.4914E−02 | 7.4840E−02 | −5.7584E−03 | −6.6374E−03 | 2.7704E−03 | 1.7981E−04 | −2.0616E−04 | 5.3663E−05 | 2.6793E−05 |
| S8 | 1.9111E−02 | 1.4531E−01 | −6.9459E−02 | 1.8346E−02 | 1.2157E−03 | −3.5439E−03 | 2.3029E−03 | −7.7473E−04 | 1.5122E−04 |
| S9 | 7.5932E−01 | 7.8930E−02 | −9.5168E−02 | 6.3922E−02 | −3.0589E−02 | 1.4630E−02 | −4.1668E−03 | 8.0841E−04 | −1.4083E−04 |
| S10 | 2.4891E−02 | 1.4643E−01 | 1.2972E−01 | −2.2891E−02 | −2.1407E−02 | 9.3133E−03 | 8.1198E−03 | −1.7355E−03 | −7.8068E−04 |
| S11 | −4.9777E−01 | 8.5581E−01 | 4.9509E−01 | −1.0423E−01 | −1.5718E−01 | 5.5216E−03 | 6.1221E−02 | 3.5340E−03 | −1.5464E−02 |
| S12 | −9.8457E−03 | 7.4299E−01 | 8.2398E−02 | 1.6289E−01 | −2.3109E−02 | −1.2227E−01 | 3.6826E−02 | 1.5341E−02 | 3.9560E−03 |
| S13 | −1.7940E+00 | −6.6226E−01 | −6.6294E−02 | 1.8543E−01 | 2.8473E−01 | 1.7655E−01 | 2.4170E−02 | −3.5435E−02 | −3.4661E−02 |
| S14 | −5.7893E+00 | 1.0611E+00 | −3.6441E−01 | 7.5989E−02 | −8.0817E−02 | 3.1960E−03 | 9.5569E−03 | −1.2997E−02 | 1.0727E−03 |

Figure 2A:
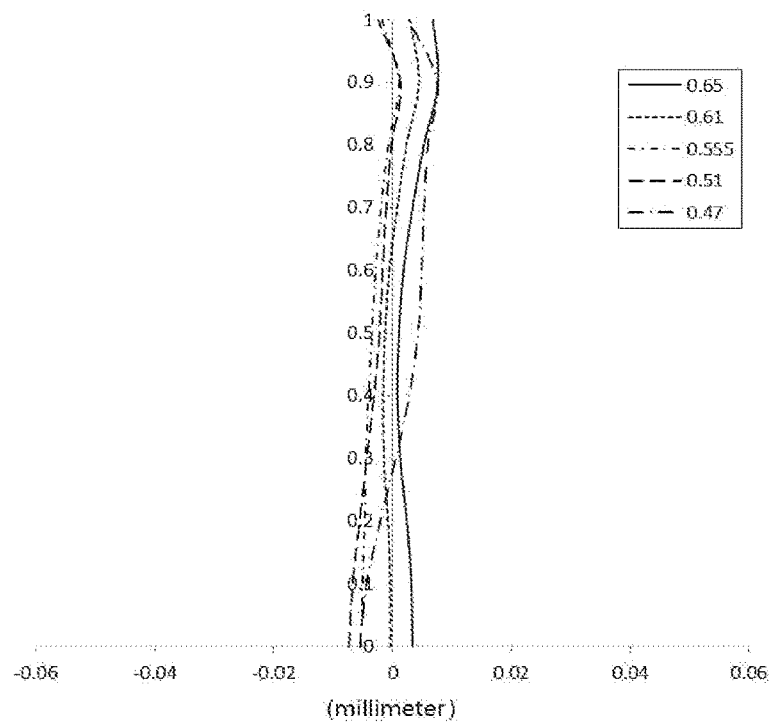
FIG. 2A to FIG. 2D show a longitudinal aberration curve, astigmatism curve, distortion curve and lateral color curve of an optical imaging lens according to embodiment 1 respectively.
Figure 2B:
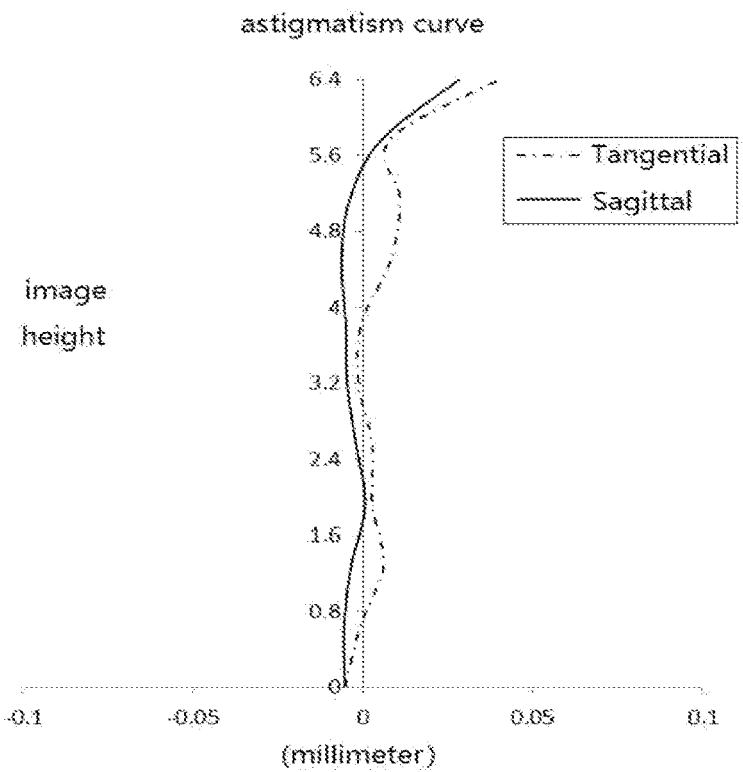
Figure 2C:
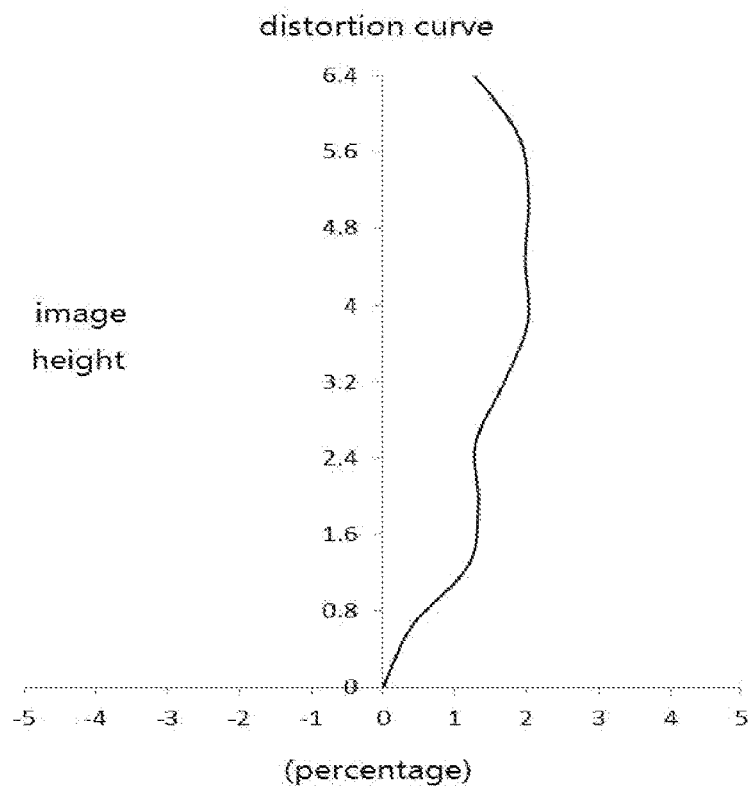
Figure 2D:
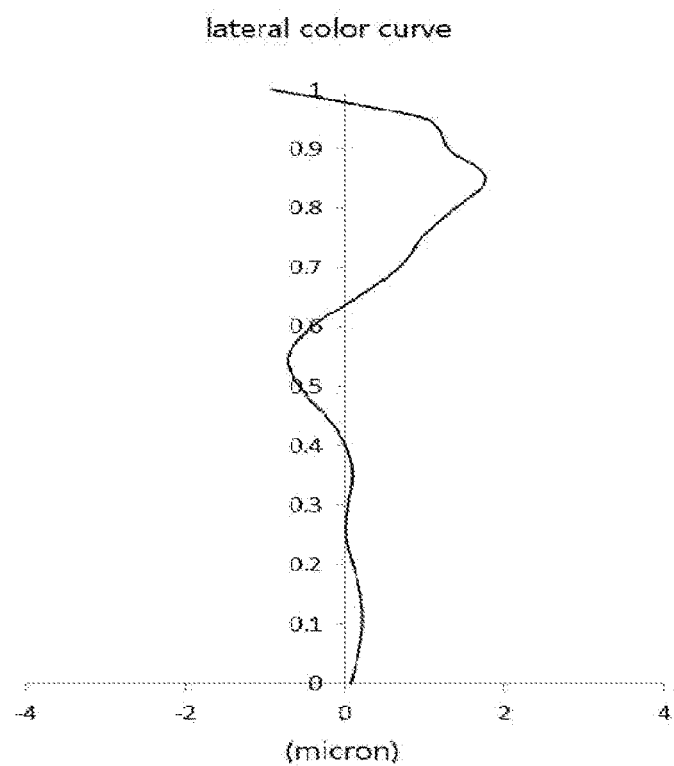

FIG. 2A shows a longitudinal aberration curve of the optical imaging lens according to embodiment 1 to represent deviation of a convergence focal point after light with different wavelengths passes through the lens. FIG. 2B shows an astigmatism curve of the optical imaging lens according to embodiment 1 to represent a meridian image surface curvature and a sagittal image surface curvature. FIG. 2C shows a distortion curve of the optical imaging lens according to embodiment 1 to represent distortion values corresponding to different image heights. FIG. 2D shows a lateral color curve of the optical imaging lens according to embodiment 1 to represent deviation of different image heights on the imaging surface after the light passes through the lens. According to FIG. 2A to FIG. 2D, it can be seen that the optical imaging lens provided in embodiment 1 may achieve high imaging quality.

Embodiment 2

Figure 3:
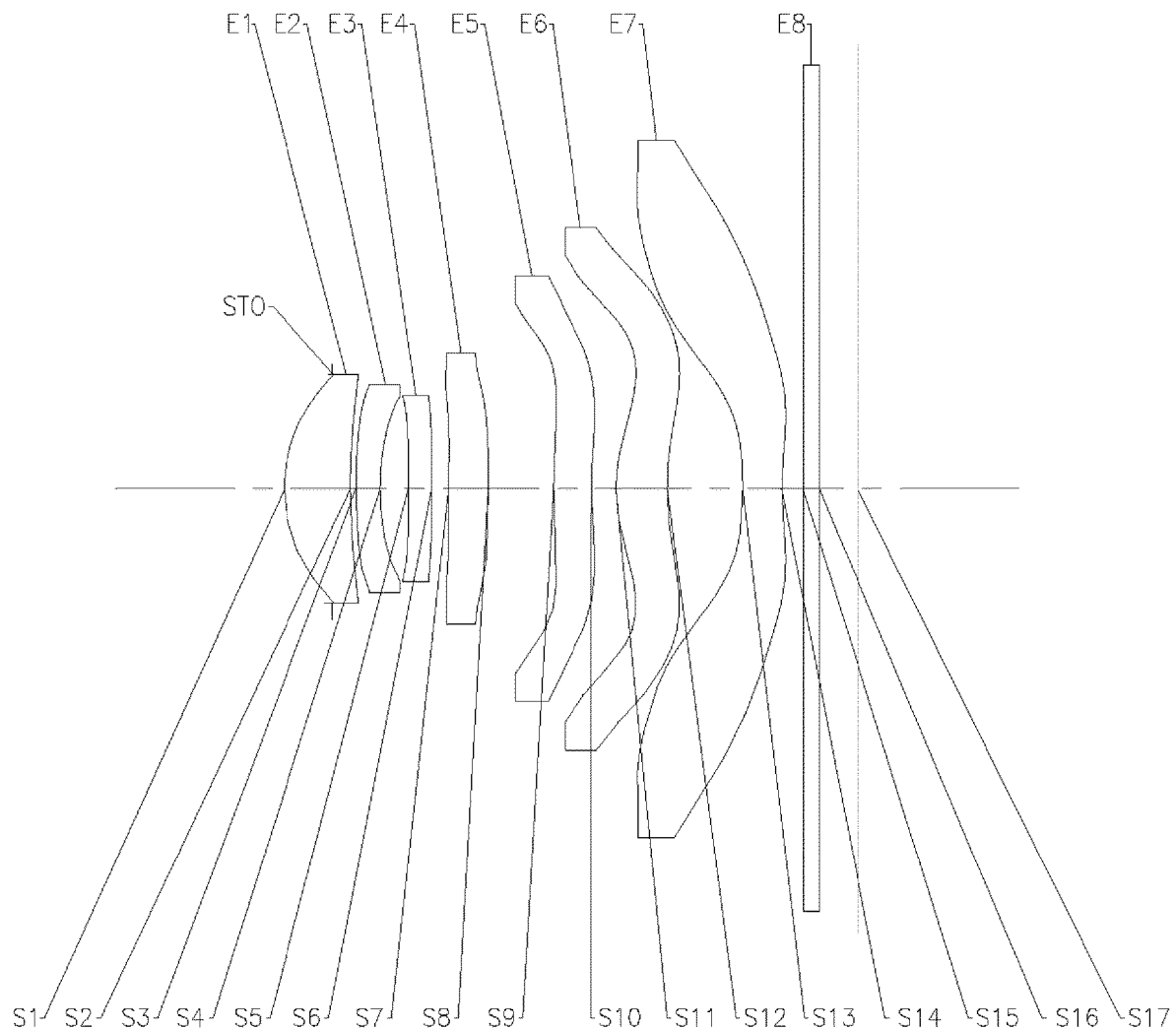
FIG. 3 shows a structure diagram of an optical imaging lens according to embodiment 2 of the disclosure.

An optical imaging lens according to embodiment 2 of the disclosure will be described below with reference to FIG. 3 to FIG. 4D. In the embodiment and the following embodiments, part of descriptions similar to those about embodiment are omitted for simplicity. FIG. 3 shows a structure diagram of an optical imaging lens according to embodiment 2 of the disclosure.

As shown in FIG. 3, the optical imaging lens sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a concave surface, while an image-side surface S6 is a convex surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a concave surface, while an image-side surface S12 is a convex surface. The seventh lens E7 has negative refractive power, an object-side surface S13 thereof is a concave surface, while an image-side surface S14 is a convex surface. The optical filter E8 has an object-side surface S15 and an image-side surface S16. The optical imaging lens has an imaging surface S17. Light from an object sequentially penetrates through each of the surfaces S1 to S16 and is finally imaged on the imaging surface S17.

In embodiment 2, a value of a total effective focal length $f$ of the optical imaging lens is 6.63 mm, and a value of a maximum FOV is 87.4°.

Table 3 is a basic parameter table of the optical imaging lens of embodiment 2, and units of the curvature radius, the thickness/distance and the focal length are all millimeter (mm). Table 4 shows high-order coefficients applied to each aspherical mirror surface in embodiment 2. A surface type of each aspherical surface may be defined by the formula (1) given in embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6375 | | | | |
| S1 | Aspherical | 2.3975 | 0.8682 | 1.546 | 56.11 | 5.45 | 0.0000 |
| S2 | Aspherical | 12.4601 | 0.0742 | | | | 0.0000 |
| S3 | Aspherical | 6.1900 | 0.3162 | 1.678 | 19.25 | −12.25 | 0.0000 |
| S4 | Aspherical | 3.4819 | 0.3681 | | | | 0.0000 |
| S5 | Aspherical | −12.0814 | 0.3072 | 1.678 | 19.25 | −151.80 | 0.0000 |
| S6 | Aspherical | −24.0308 | 0.2227 | | | | 0.0000 |
| S7 | Aspherical | −43.2121 | 0.5193 | 1.546 | 56.11 | 33.6982 | 0.0000 |
| S8 | Aspherical | −11.4032 | 0.8577 | | | | 0.0000 |
| S9 | Aspherical | −7.2989 | 0.5000 | 1.570 | 37.32 | −24.2058 | 0.0000 |
| S10 | Aspherical | −8.5684 | 0.3215 | | | | 0.0000 |
| S11 | Aspherical | −8.7152 | 0.6745 | 1.546 | 56.11 | 8.2553 | 0.0000 |
| S12 | Aspherical | −8.0404 | 0.9877 | | | | 0.0000 |
| S13 | Aspherical | −8.7596 | 0.5100 | 1.536 | 55.74 | −5.6876 | 0.0000 |
| S14 | Aspherical | −9.6724 | 0.2805 | | | | 0.0000 |
| S15 | Spherical | Infinite | 0.2142 | 1.517 | 64.17 | | |
| S16 | Spherical | Infinite | 0.5061 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 5.6361E−02 | −2.5411E−02 | 1.0980E−02 | −4.0092E−03 | 1.4335E−03 | −4.6916E−04 | 1.3796E−04 | −3.8318E−05 | 1.5599E−05 |
| S2 | 3.5558E−02 | −1.4845E−02 | 8.5170E−03 | 6.8749E−04 | −2.1106E−03 | 2.2775E−03 | −1.3842E−03 | 6.7742E−04 | −1.9075E−04 |
| S3 | −1.3648E−01 | 2.7687E−02 | −2.4111E−03 | 1.7501E−03 | −9.3695E−04 | 1.1322E−03 | −6.2394E−04 | 2.7954E−04 | −6.9536E−05 |
| S4 | −6.2308E−02 | 8.4439E−04 | 6.8300E−03 | −5.1738E−03 | 3.3458E−03 | −1.5471E−03 | 6.0732E−04 | −1.6555E−04 | 2.1288E−05 |

TABLE 4-continued

| Surface number | A4 | A6 | A8 | A10 | A12 | A14 | A16 | A18 | A20 |
|---|---|---|---|---|---|---|---|---|---|
| S5 | 1.0734E−01 | −9.0074E−03 | 4.9558E−03 | −4.1453E−03 | 2.7900E−03 | −1.3479E−03 | 5.5902E−04 | −1.8693E−04 | 4.0548E−05 |
| S6 | 1.6760E−02 | 1.9690E−02 | −5.0720E−03 | 8.0396E−04 | 1.1187E−04 | −8.6118E−06 | −1.0049E−05 | 8.0415E−06 | 2.0557E−06 |
| S7 | −6.5241E−02 | 5.4548E−02 | 8.4862E−03 | −7.7361E−03 | 5.2207E−04 | 1.1776E−03 | −2.0857E−04 | −1.7429E−04 | 9.2362E−05 |
| S8 | −9.4224E−02 | 9.4117E−02 | 1.8981E−03 | −1.3769E−02 | 5.0277E−03 | 2.0003E−04 | −6.7281E−04 | 2.3613E−04 | −1.1619E−05 |
| S9 | 3.5438E−01 | 2.9640E−01 | −1.0309E−01 | −3.3219E−02 | 4.1182E−02 | −8.8540E−03 | −7.6102E−05 | 1.0094E−03 | −1.4277E−04 |
| S10 | 2.1149E−01 | 2.0937E−01 | 1.5325E−01 | −6.3021E−02 | 8.5556E−03 | 1.8973E−02 | 8.6358E−03 | −6.2928E−03 | 1.4695E−03 |
| S11 | 6.1356E−01 | 7.0924E−01 | 2.1251E−01 | −1.8725E−01 | 3.0854E−02 | 2.7427E−02 | −1.1693E−03 | −1.6920E−02 | 6.5317E−03 |
| S12 | 3.9446E−01 | 7.6954E−01 | −7.1193E−02 | 6.5055E−02 | −7.5268E−03 | −6.0853E−02 | 2.2553E−02 | −1.5976E−02 | −5.9630E−04 |
| S13 | −1.6888E+00 | −5.4395E−01 | −2.8075E−02 | 1.0801E−01 | 2.2405E−01 | 1.3204E−01 | 1.0985E−02 | −3.4605E−03 | −1.9508E−03 |
| S14 | 1.2715E−01 | 9.7808E−02 | 1.8733E−01 | −1.9956E−02 | 2.3852E−01 | 4.9957E−02 | 3.3977E−02 | 6.6821E−02 | −3.2301E−02 |

Figure 4A:
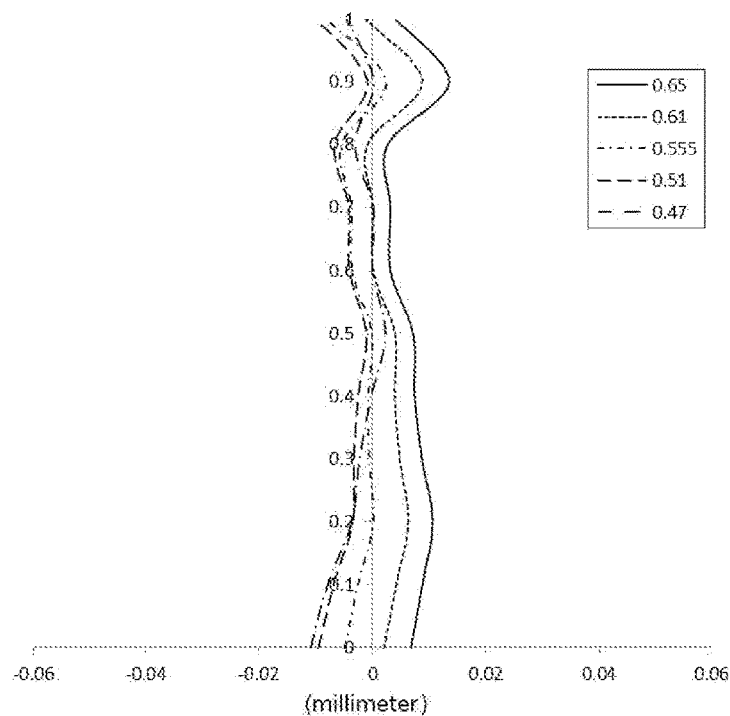
FIG. 4A to FIG. 4D show a longitudinal aberration curve, astigmatism curve, distortion curve and lateral color curve of an optical imaging lens according to embodiment 2 respectively.
Figure 4B:
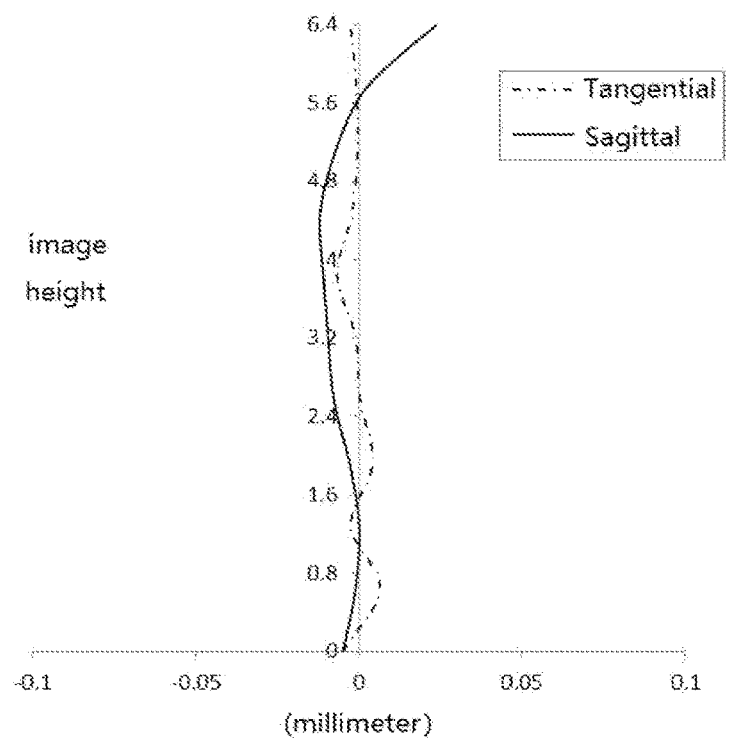
Figure 4C:
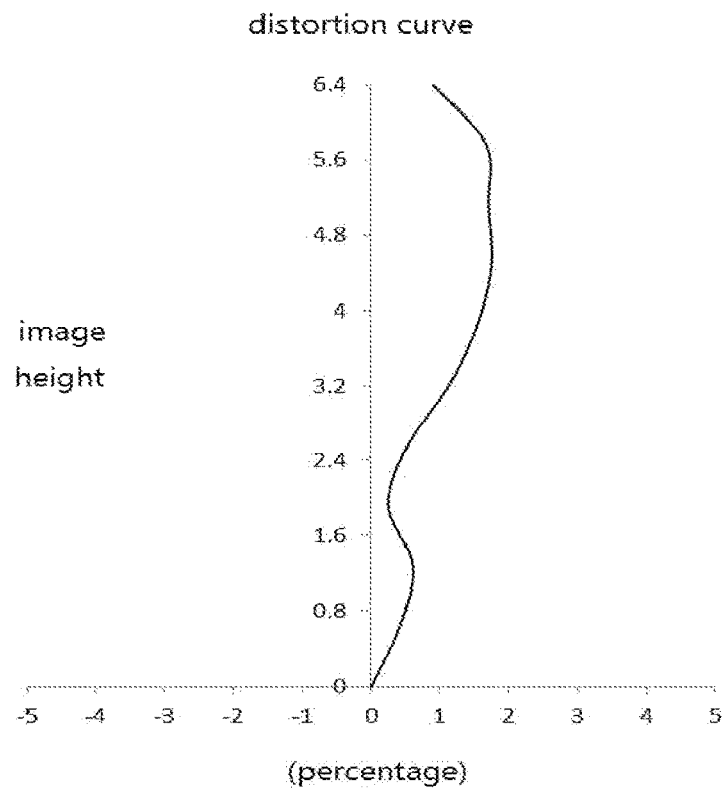
Figure 4D:
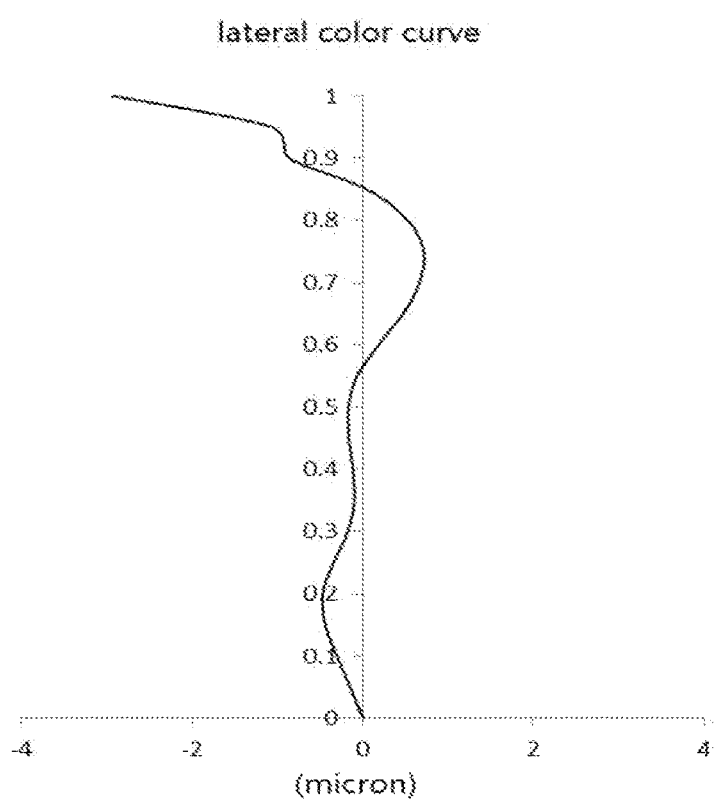

FIG. 4A shows a longitudinal aberration curve of the optical imaging lens according to embodiment 2 to represent deviation of a convergence focal point after light with different wavelengths passes through the lens. FIG. 4B shows an astigmatism curve of the optical imaging lens according to embodiment 2 to represent a meridian image surface curvature and a sagittal image surface curvature. FIG. 4C shows a distortion curve of the optical imaging lens according to embodiment 2 to represent distortion values corresponding to different image heights. FIG. 4D shows a lateral color curve of the optical imaging lens according to embodiment 2 to represent deviation of different image heights on the imaging surface after the light passes through the lens. According to FIG. 4A to FIG. 4D, it can be seen that the optical imaging lens provided in embodiment 2 may achieve high imaging quality.

Embodiment 3

Figure 5:
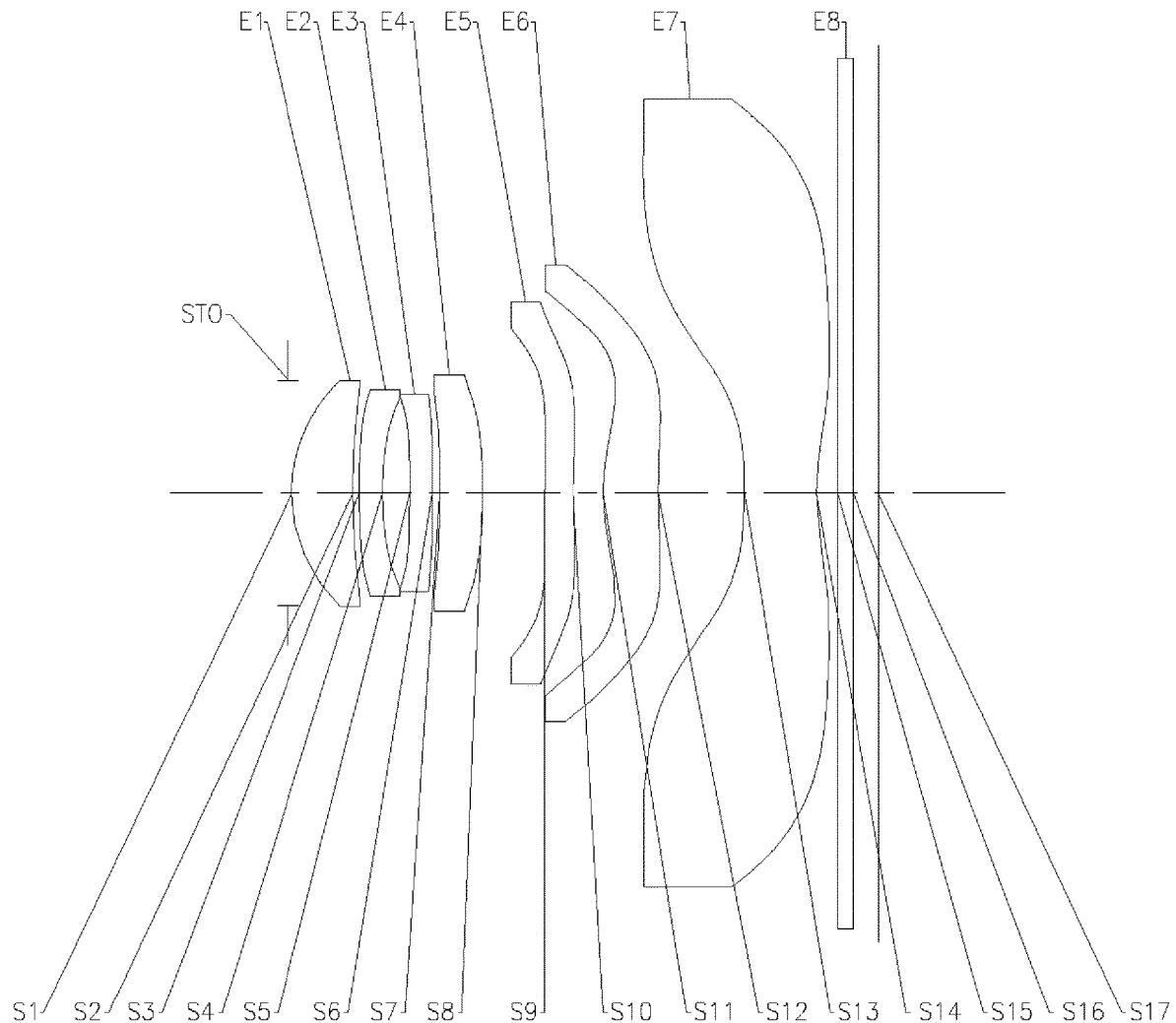
FIG. 5 shows a structure diagram of an optical imaging lens according to embodiment 3 of the disclosure.

An optical imaging lens according to embodiment 3 of the disclosure is described below with reference to FIG. 5 to FIG. 6D. FIG. 5 shows a structure diagram of an optical imaging lens according to embodiment 3 of the disclosure.

As shown in FIG. 5, the optical imaging lens sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a concave surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a convex surface, while an image-side surface S10 is a concave surface. The sixth lens E6 has positive refractive power, an object-side surface S11 thereof is a convex surface, while an image-side surface S12 is a concave surface. The seventh lens E7 has negative refractive power, an object-side surface S13 thereof is a concave surface, while an image-side surface S14 is a concave surface. The optical filter E8 has an object-side surface S15 and an image-side surface S16. The optical imaging lens has an imaging surface S17. Light from an object sequentially penetrates through each of the surfaces S1 to S16 and is finally imaged on the imaging surface S17.

In embodiment 3, a value of a total effective focal length f of the optical imaging lens is 6.70 mm, and a value of a maximum FOV is 88.2n.

Table 5 is a basic parameter table of the optical imaging lens of embodiment 3, and units of the curvature radius, the thickness/distance and the focal length are all millimeter (mm). Table 6 shows high-order coefficients applied to each aspherical mirror surface in embodiment 3. A surface type of each aspherical surface may be defined by the formula (1) given in embodiment 5

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | 0.0500 | | | | |
| S1 | Aspherical | 2.4782 | 0.8209 | 1.546 | 56.11 | 5.70 | 0.0095 |
| S2 | Aspherical | 10.7861 | 0.0823 | | | | −11.0838 |
| S3 | Aspherical | 11.4724 | 0.3162 | 1.678 | 19.25 | −16.04 | 0.8409 |
| S4 | Aspherical | 5.5187 | 0.3681 | | | | 0.8059 |
| S5 | Aspherical | −46.3147 | 0.3000 | 1.678 | 19.25 | −38.55 | 79.9649 |
| S6 | Aspherical | 60.0647 | 0.1015 | | | | −67.4286 |
| S7 | Aspherical | −80.0233 | 0.5758 | 1.546 | 56.11 | 23.8145 | −99.0000 |
| S8 | Aspherical | −11.2114 | 0.8353 | | | | −72.9903 |
| S9 | Aspherical | 17.6922 | 0.3838 | 1.570 | 37.32 | −21.2177 | −98.9945 |
| S10 | Aspherical | 7.1298 | 0.4067 | | | | 2.3194 |
| S11 | Aspherical | 3.2487 | 0.7383 | 1.546 | 56.11 | 8.0164 | −1.3280 |
| S12 | Aspherical | 11.6001 | 1.1588 | | | | 5.6116 |
| S13 | Aspherical | −9.8699 | 0.9662 | 1.536 | 55.74 | −5.2211 | −0.0999 |
| S14 | Aspherical | 4.0476 | 0.2857 | | | | −1.9717 |

TABLE 5-continued

| Surface number | Surface type | Curvature radius | Thickness/ distance | Material Refractive index | Abbe number | Focal length | Conic coefficient |
|---|---|---|---|---|---|---|---|
| S15 | Spherical | Infinite | 0.2142 | 1.517 | 64.17 | | |
| S16 | Spherical | Infinite | 0.3392 | | | | |
| S17 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 3.0337E−01 | 3.1695E−03 | 1.6636E−03 | −1.5098E−02 | 2.8714E−03 | −3.0089E−03 | −1.8075E−04 | 1.3784E−04 | −1.7779E−03 |
| S2 | −2.4413E−02 | 8.3942E−03 | −2.5568E−03 | 1.5240E−03 | −7.3557E−04 | 1.6292E−04 | 3.1962E−04 | 3.3475E−04 | 1.5135E−04 |
| S3 | 3.4205E−02 | 1.2348E−02 | −1.2150E−03 | 1.6739E−04 | −1.7477E−04 | −6.2772E−05 | −7.3700E−06 | −1.8996E−05 | −5.3054E−06 |
| S4 | 4.4335E−02 | 7.6619E−03 | −4.8954E−04 | −2.5917E−04 | −2.8411E−04 | −1.2559E−04 | −5.4528E−05 | −1.8279E−05 | −8.0916E−06 |
| S5 | −8.2368E−02 | −2.1159E−03 | −5.5340E−05 | −9.4392E−06 | −6.6714E−05 | −2.0705E−05 | −1.6600E−05 | −1.6749E−06 | −1.1267E−06 |
| S6 | −6.6011E−02 | 5.3307E−03 | 6.2401E−04 | 1.0419E−04 | −6.9304E−05 | 1.9518E−05 | −7.6495E−06 | 7.3561E−06 | −1.9355E−06 |
| S7 | −1.3124E−01 | 1.8537E−02 | −6.8003E−03 | −1.3323E−03 | 1.0681E−03 | 5.3773E−04 | −3.8089E−04 | −3.3677E−04 | −1.3817E−04 |
| S8 | −2.1405E−01 | 3.9071E−02 | 7.3370E−03 | −4.7870E−04 | −1.9242E−03 | −1.0715E−03 | −4.8649E−04 | −1.2185E−04 | −3.8475E−05 |
| S9 | −1.1589E+00 | 8.6561E−03 | −6.9098E−03 | −1.2015E−02 | −6.9381E−03 | 9.0301E−03 | 6.6574E−03 | 3.3772E−03 | 1.2690E−04 |
| S10 | −1.6507E+00 | 3.2653E−01 | −4.1616E−02 | 6.5085E−03 | −5.9748E−03 | 8.9026E−03 | −1.2035E−03 | −4.9996E−04 | −1.6902E−03 |
| S11 | −3.5386E+00 | 5.2569E−01 | 1.0618E−02 | −8.5567E−02 | −5.6541E−02 | 3.9126E−04 | 1.0057E−02 | 9.4235E−03 | 1.5072E−03 |
| S12 | −2.8839E+00 | 3.3231E−01 | −1.8888E−03 | −4.6196E−03 | 3.8920E−02 | 1.2098E−02 | −1.5799E−03 | −2.9081E−04 | −2.6310E−04 |
| S13 | −3.8744E−01 | 8.4389E−01 | −5.1773E−01 | 2.5897E−01 | −9.7399E−02 | 2.9156E−02 | 3.8444E−04 | −1.8403E−03 | 1.9260E−03 |
| S14 | −6.5130E+00 | 1.1939E+00 | −4.7032E−01 | 3.6160E−01 | −6.7257E−02 | 1.0851E−01 | −3.3383E−03 | 1.8934E−02 | 2.8417E−03 |

Figure 6A:
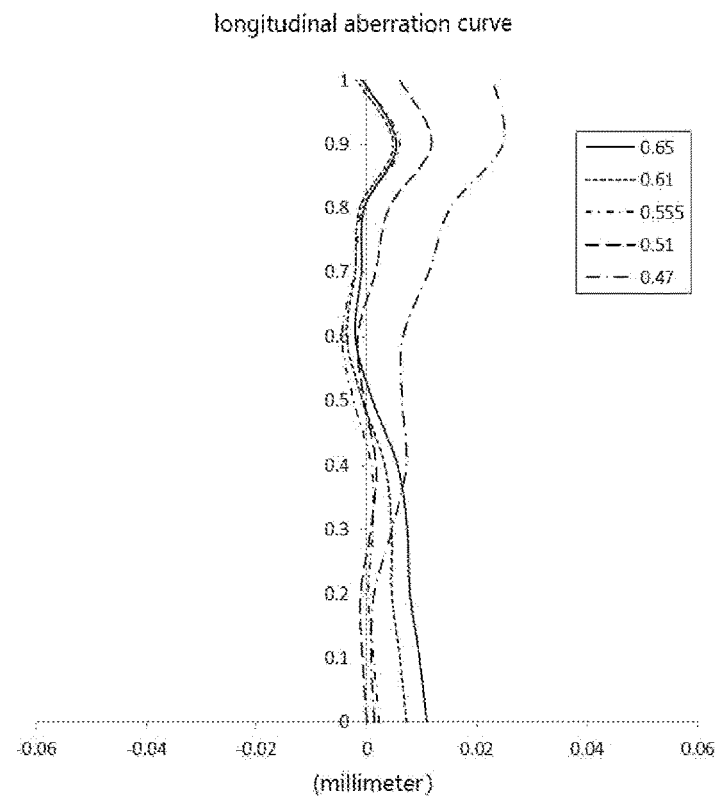
FIG. 6A to FIG. 6D show a longitudinal aberration curve, astigmatism curve, distortion curve and lateral color curve of an optical imaging lens according to embodiment 3 respectively.
Figure 6B:
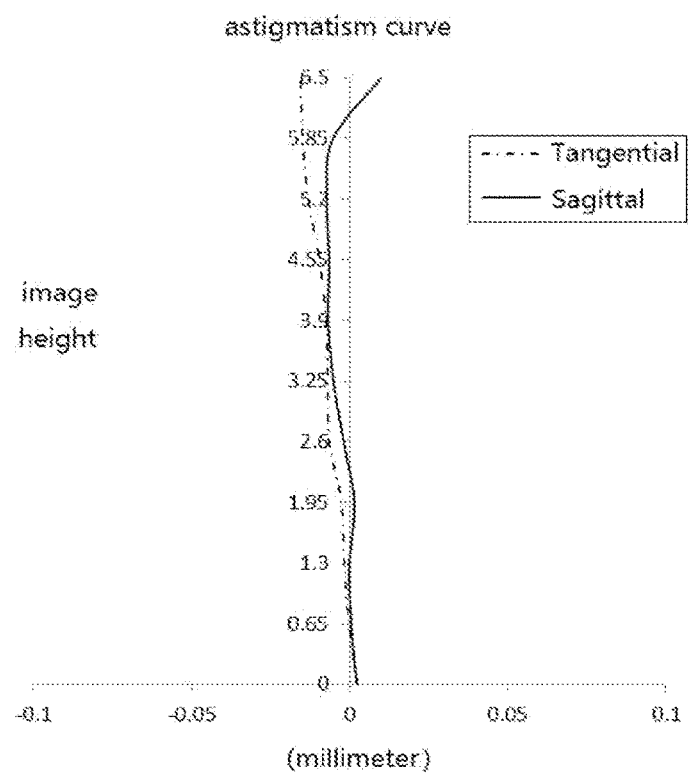
Figure 6C:
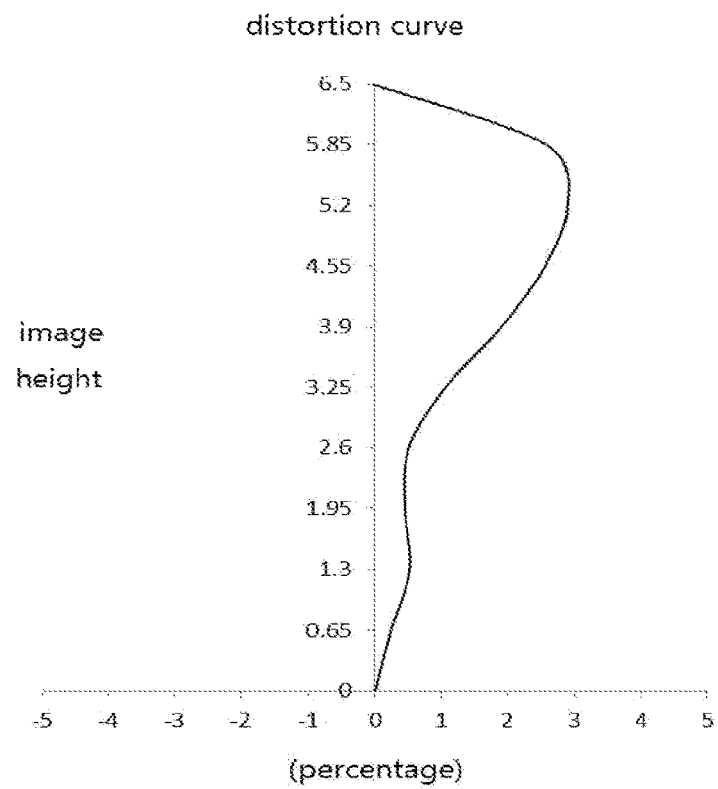
Figure 6D:
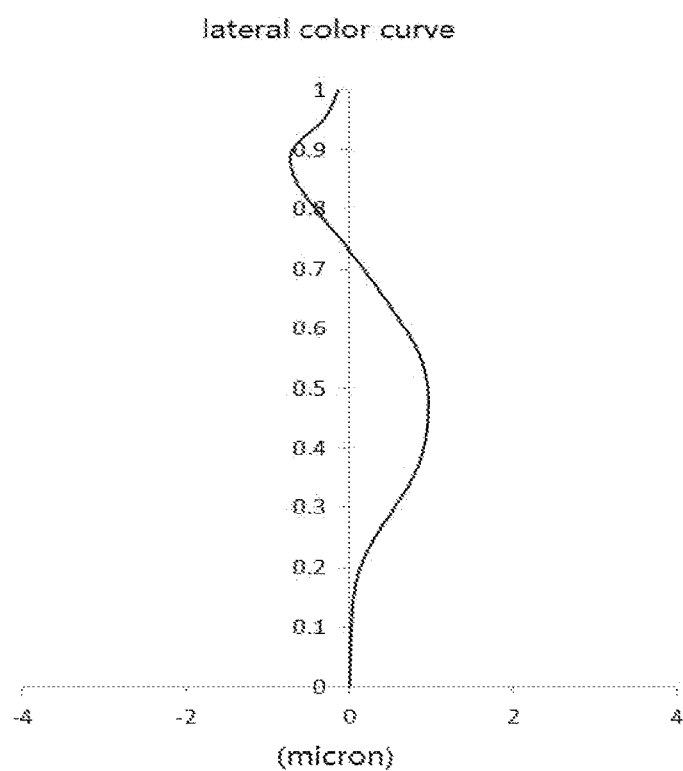

FIG. 6A shows a longitudinal aberration curve of the optical imaging lens according to embodiment 3 to represent deviation of a convergence focal point after light with different wavelengths passes through the lens. FIG. 6B shows an astigmatism curve of the optical imaging lens according to embodiment 3 to represent a meridian image surface curvature and a sagittal image surface curvature. FIG. 6C shows a distortion curve of the optical imaging lens according to embodiment 3 to represent distortion values corresponding to different image heights. FIG. 6D shows a lateral color curve of the optical imaging lens according to embodiment 3 to represent deviation of different image heights on the imaging surface after the light passes through the lens. According to FIG. 6A to FIG. 6D, it can be seen that the optical imaging lens provided in embodiment 3 may achieve high imaging quality.

Embodiment 4

Figure 7:
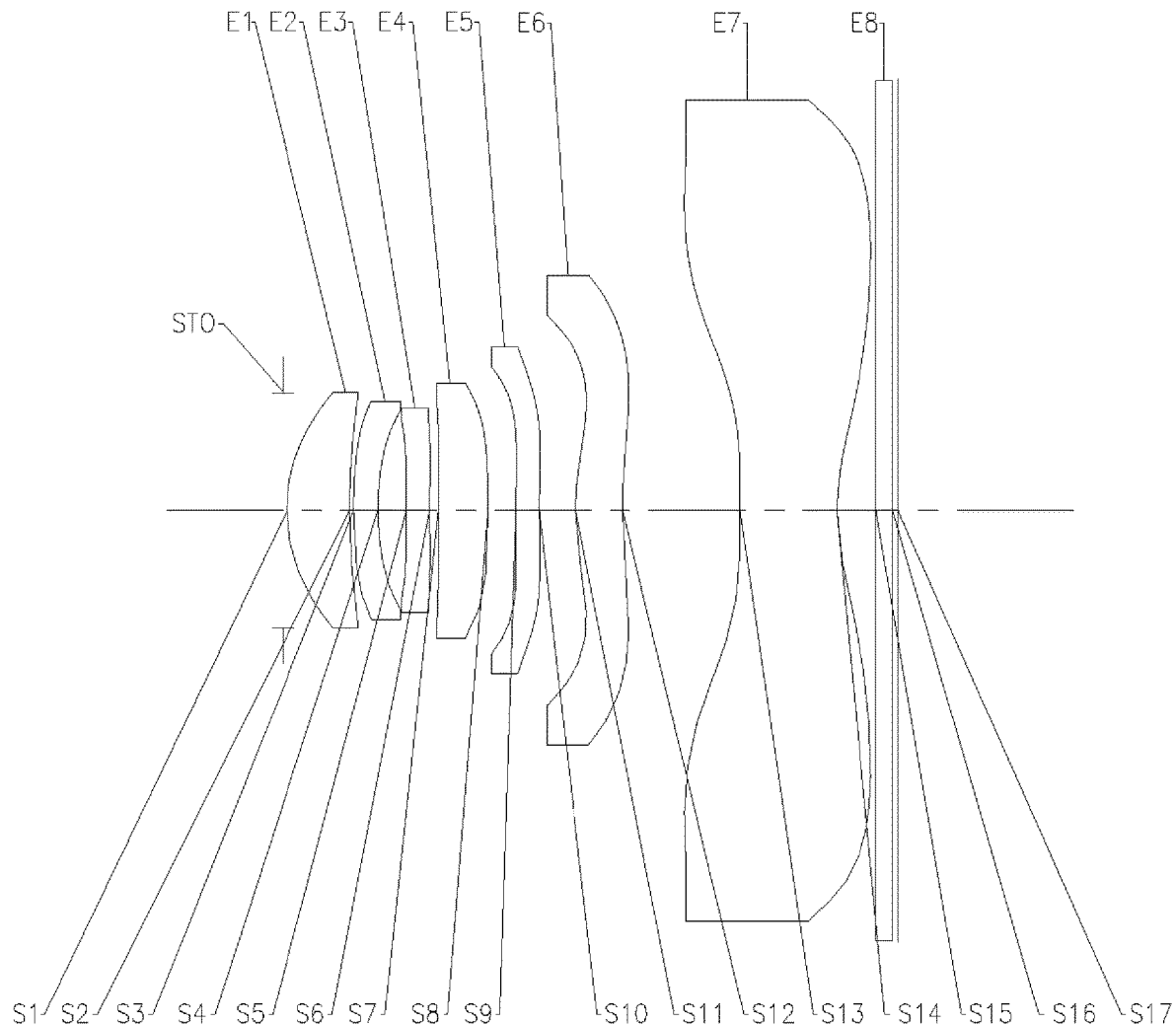
FIG. 7 shows a structure diagram of an optical imaging lens according to embodiment 4 of the disclosure.

An optical imaging lens according to embodiment 4 of the disclosure is described below with reference to FIG. 7 to FIG. 8D. FIG. 7 shows a structure diagram of an optical imaging lens according to embodiment 4 of the disclosure.

As shown in FIG. 7, the optical imaging lens sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a concave surface, while an image-side surface S6 is a concave surface. The fourth lens E4 has positive refractive power, an object-side surface S7 thereof is a convex surface, while an image-side surface S8 is a convex surface. The fifth lens E5 has negative refractive power, an object-side surface S9 thereof is a convex surface, while an image-side surface S10 is a concave surface. The sixth lens E6 has positive refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. The optical imaging lens has an imaging surface S17. Light from an object sequentially penetrates through each of the surfaces S1 to S16 and is finally imaged on the imaging surface S17.

In embodiment 4, a value of a total effective focal length f of the optical imaging lens is 6.67 mm, and a value of a maximum FOV is 87.3°.

Table 7 is a basic parameter table of the optical imaging lens of embodiment 4, and units of the curvature radius, the thickness/distance and the focal length are all millimeter (mm). Table 8 shows high-order coefficients applied to each aspherical mirror surface in embodiment 4. A surface type of each aspherical surface may be defined by the formula (1) given in embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0500 | | | | |
| S1 | Aspherical | 2.5150 | 0.8141 | 1.546 | 56.11 | 5.95 | −0.0982 |
| S2 | Aspherical | 9.8548 | 0.0512 | | | | −5.7157 |
| S3 | Aspherical | 7.8221 | 0.3162 | 1.678 | 19.25 | −16.52 | 6.5023 |
| S4 | Aspherical | 4.5292 | 0.3681 | | | | 0.6920 |
| S5 | Aspherical | −209.8667 | 0.3000 | 1.678 | 19.25 | −25.50 | −99.0000 |
| S6 | Aspherical | 18.8387 | 0.1140 | | | | −51.4067 |
| S7 | Aspherical | 19.9979 | 0.6435 | 1.546 | 56.11 | 16.8155 | 60.5140 |
| S8 | Aspherical | −16.7741 | 0.3613 | | | | 65.7398 |
| S9 | Aspherical | 25.8825 | 0.3004 | 1.570 | 37.32 | −36.9385 | −96.5655 |
| S10 | Aspherical | 11.5656 | 0.4793 | | | | 9.5319 |
| S11 | Aspherical | 3.8947 | 0.6092 | 1.546 | 56.11 | 12.2565 | −0.5182 |
| S12 | Aspherical | 8.8057 | 1.5202 | | | | 5.1210 |
| S13 | Aspherical | 222.3223 | 1.2557 | 1.536 | 55.74 | −6.4553 | −99.0000 |
| S14 | Aspherical | 3.4051 | 0.5125 | | | | −7.2666 |
| S15 | Spherical | Infinite | 0.2142 | 1.517 | 64.17 | | |
| S16 | Spherical | Infinite | 0.0700 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −5.5990E−03 | −5.0949E−03 | −1.4527E−03 | −5.6438E−04 | −3.7736E−04 | −2.4745E−04 | −1.0252E−04 | −2.9040E−05 | 2.9890E−06 |
| S2 | −2.1624E−02 | 4.1807E−03 | −1.2661E−03 | 8.6226E−04 | −1.7158E−04 | −5.5616E−05 | −3.0706E−05 | 1.5047E−05 | −1.3144E−05 |
| S3 | 5.6845E−02 | 1.3058E−02 | −3.7620E−04 | 6.3416E−04 | −1.2156E−04 | −2.1719E−05 | −1.3589E−05 | 2.1302E−05 | 1.9706E−06 |
| S4 | 6.2056E−02 | 5.5302E−03 | 9.6736E−05 | −7.3191E−05 | −1.3696E−04 | −3.7171E−05 | −1.7788E−05 | −8.3854E−07 | −1.1770E−06 |
| S5 | −9.0963E−02 | 8.6194E−04 | 4.1636E−04 | 8.3259E−05 | −2.4116E−04 | −7.6461E−05 | −3.3598E−05 | −8.4418E−06 | −3.2456E−06 |
| S6 | −8.0268E−02 | 1.2493E−02 | 1.7415E−03 | 5.0960E−04 | −1.1531E−04 | −9.1478E−06 | −2.5188E−06 | 4.3188E−06 | −3.2611E−07 |
| S7 | −1.0444E−01 | 1.3828E−02 | 2.5205E−03 | 4.7411E−05 | −1.5115E−04 | −4.7810E−05 | 1.6212E−05 | 6.9707E−06 | 1.1723E−06 |
| S8 | −1.6665E−01 | −7.1369E−03 | 6.5722E−03 | 7.2076E−04 | 7.5551E−04 | 5.1681E−05 | 3.6582E−05 | −3.5956E−06 | −9.3624E−07 |
| S9 | −3.7943E−01 | −1.6533E−02 | 3.6200E−03 | −3.8360E−04 | 2.2663E−04 | −5.3554E−05 | 5.0003E−05 | −1.9995E−05 | −2.1468E−06 |
| S10 | −6.0650E−01 | 7.8060E−02 | −6.1460E−03 | 1.4296E−04 | −1.2156E−03 | 1.3404E−04 | 3.2365E−05 | −2.6618E−05 | 4.4233E−06 |
| S11 | −1.4732E+00 | 6.5401E−02 | −1.5718E−03 | 5.9517E−03 | 4.9679E−04 | 1.1142E−04 | −1.6954E−04 | −5.5622E−05 | −1.2817E−05 |
| S12 | −1.3401E+00 | 6.2916E−03 | −1.0509E−02 | −6.3702E−03 | 1.1094E−03 | −5.1398E−04 | 1.2632E−04 | −5.6663E−05 | −2.1302E−06 |
| S13 | −1.2101E+00 | 6.6793E−01 | −2.9449E−01 | 1.0436E−01 | −3.0416E−02 | 5.8320E−03 | −9.4620E−04 | 9.9608E−05 | −6.4656E−05 |
| S14 | −2.2825E+00 | 2.7439E−01 | −2.0555E−01 | 6.4204E−02 | −2.0540E−02 | 7.1503E−03 | −4.8678E−03 | −5.2092E−04 | −9.6091E−04 |

Figure 8A:
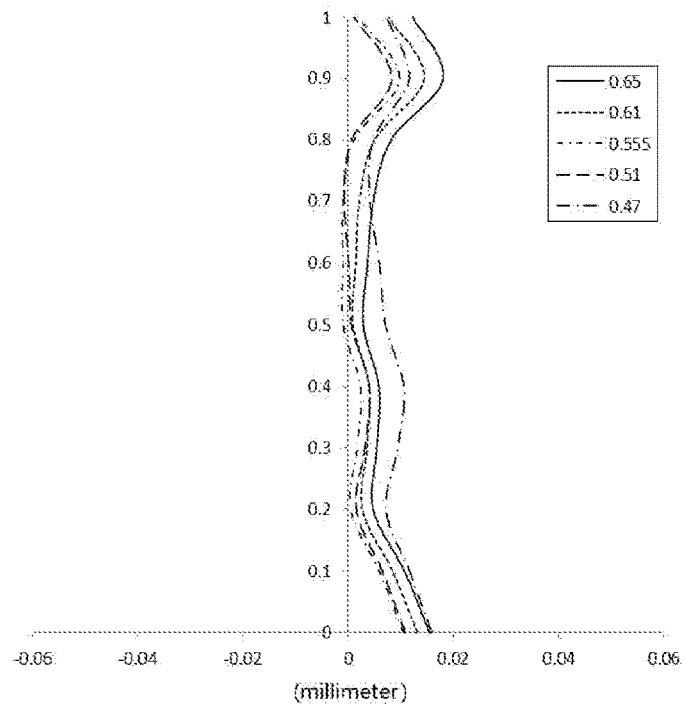
FIG. 8A to FIG. 8D show a longitudinal aberration curve, astigmatism curve, distortion curve and lateral color curve of an optical imaging lens according to embodiment 4 respectively.
Figure 8B:
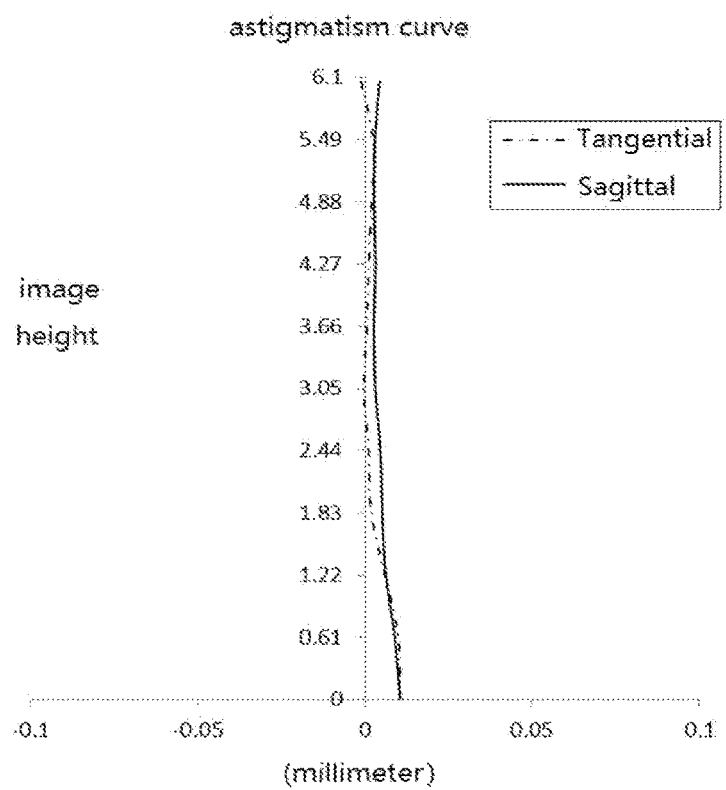
Figure 8C:
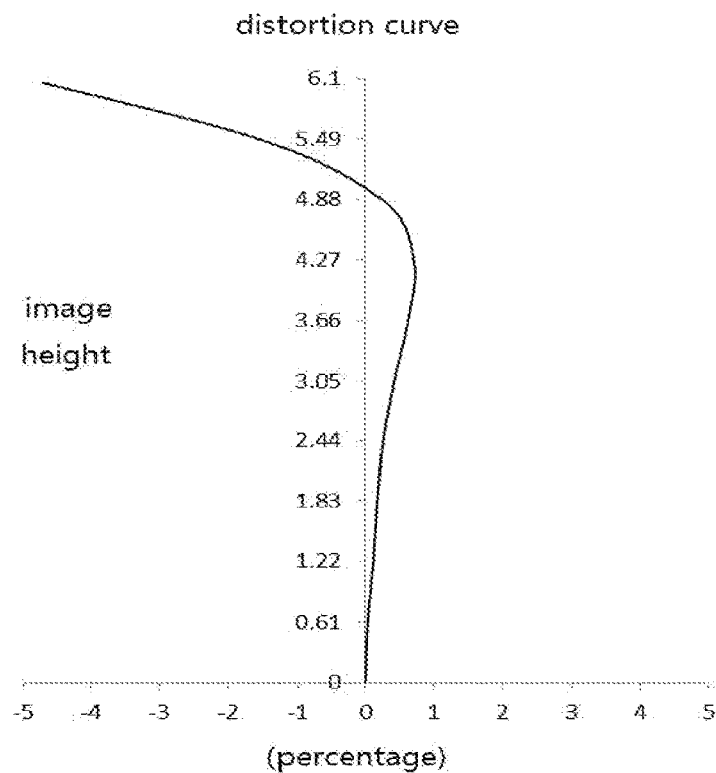
Figure 8D:
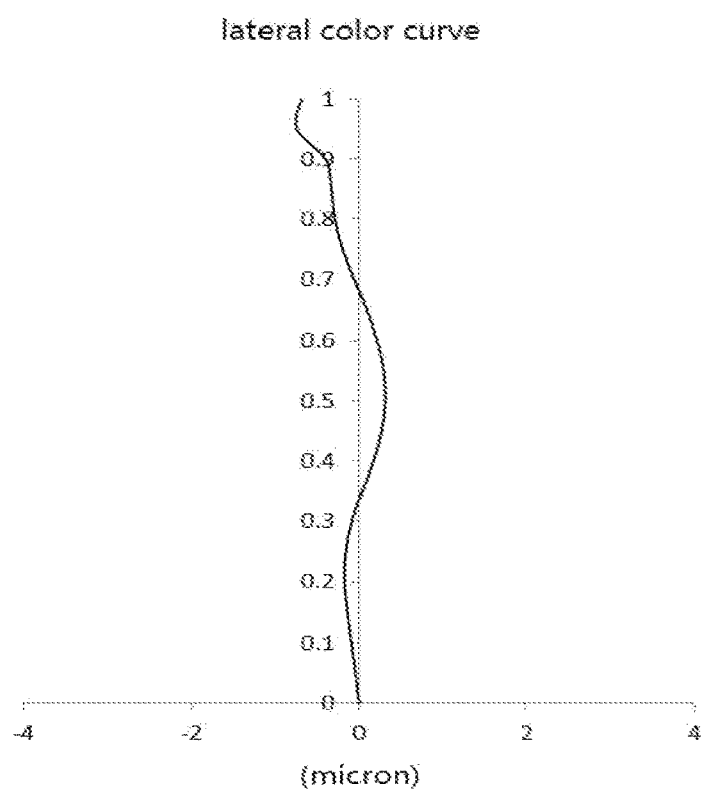

FIG. 8A shows a longitudinal aberration curve of the optical imaging lens according to embodiment 4 to represent deviation of a convergence focal point after light with different wavelengths passes through the lens. FIG. 8B shows an astigmatism curve of the optical imaging lens according to embodiment 4 to represent a meridian image surface curvature and a sagittal image surface curvature. FIG. 8C shows a distortion curve of the optical imaging lens according to embodiment 4 to represent distortion values corresponding to different image heights. FIG. 8D shows a lateral color curve of the optical imaging lens according to embodiment 4 to represent deviation of different image heights on the imaging surface after the light passes through the lens. According to FIG. 8A to FIG. 8D, it can be seen that the optical imaging lens provided in embodiment 4 may achieve high imaging quality.

Embodiment 5

Figure 9:
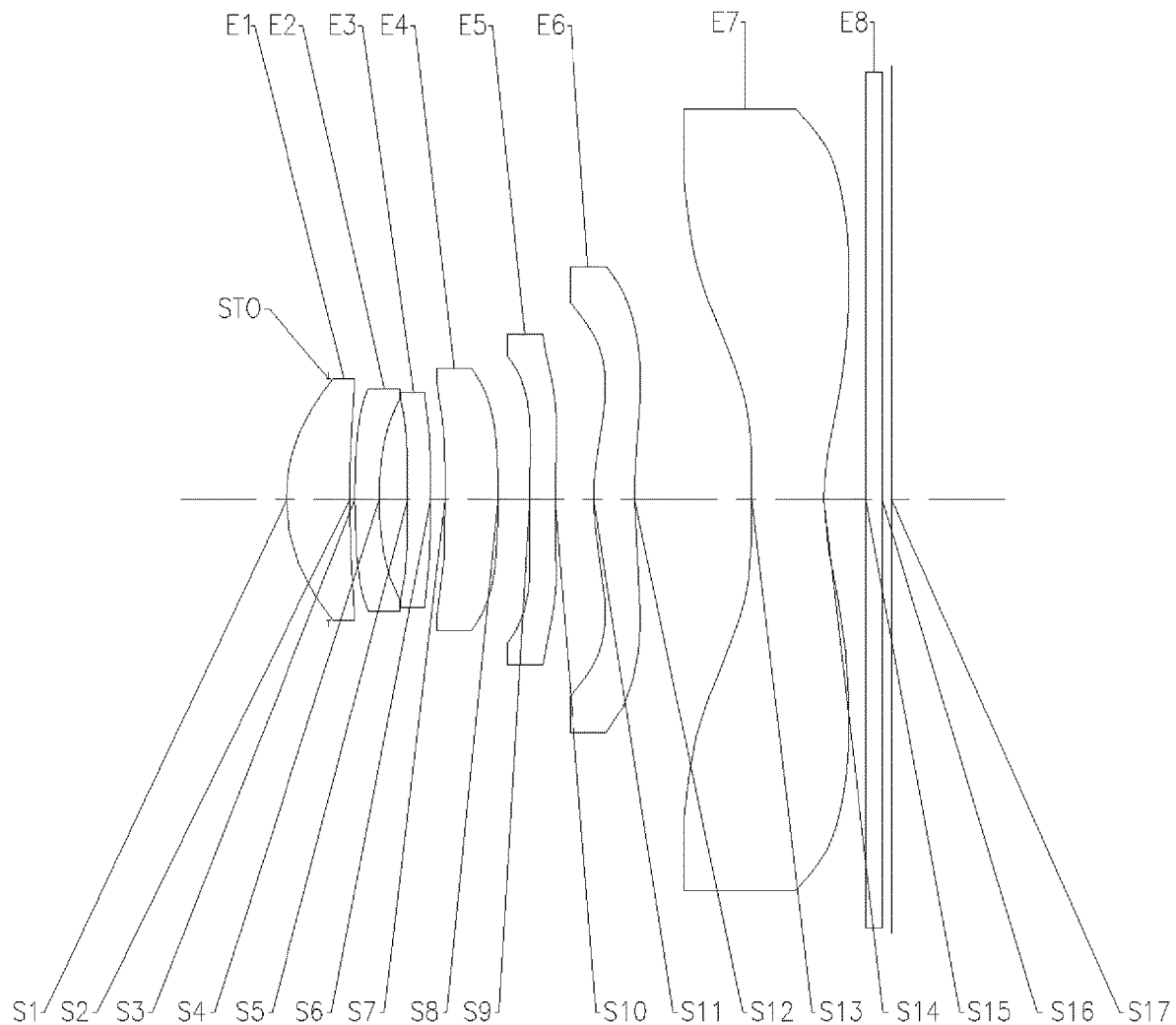
FIG. 9 shows a structure diagram of an optical imaging lens according to embodiment 5 of the disclosure.

An optical imaging lens according to embodiment 5 of the disclosure is described below with reference to FIG. 9 to FIG. 10D. FIG. 9 shows a structure diagram of an optical imaging lens according to embodiment 5 of the disclosure.

As shown in FIG. 9, the optical imaging lens sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a concave surface, while an image-side surface S6 is a convex surface. The fourth lens E4 has positive refractive power, an object-side surface S7 thereof is a concave surface, and an image-side surface S8 is a convex surface. The fifth lens E5 has negative refractive power, an object-side surface S9 thereof is a convex surface, while an image-side surface S10 is a concave surface. The sixth lens E6 has positive refractive power, an object-side surface S11 thereof is a convex surface, while an image-side surface S12 is a concave surface. The seventh lens E7 has negative refractive power, an object-side surface S13 thereof is a concave surface, while an image-side surface S14 is a concave surface. The optical filter E8 has an object-side surface S15 and an image-side surface S16. The optical imaging lens has an imaging surface S17. Light from an object sequentially penetrates through each of the surfaces S1 to S16 and is finally imaged on the imaging surface S17.

In embodiment 5, a value of a total effective focal length f of the optical imaging lens is 6.75 mm, and a value of a maximum FOV is 80.7°.

Table 9 is a basic parameter table of the optical imaging lens of embodiment 5, and units of the curvature radius, the thickness/distance and the focal length are all millimeter (mm). Table 10 shows high-order coefficients applied to each aspherical mirror surface in embodiment 5. A surface type of each aspherical surface may be defined by the formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5500 | | | | |
| S1 | Aspherical | 2.5130 | 0.8219 | 1.546 | 56.11 | 5.43 | −0.0922 |
| S2 | Aspherical | 14.6781 | 0.0672 | | | | −5.2989 |
| S3 | Aspherical | 11.9746 | 0.3162 | 1.678 | 19.25 | −12.35 | 7.8641 |
| S4 | Aspherical | 4.8727 | 0.3681 | | | | 0.6510 |
| S5 | Aspherical | −90.4326 | 0.3000 | 1.678 | 19.25 | 10000.00 | −98.9982 |
| S6 | Aspherical | −89.3611 | 0.1875 | | | | 93.3590 |
| S7 | Aspherical | −61.5279 | 0.6881 | 1.546 | 56.11 | 38.8173 | 80.6298 |
| S8 | Aspherical | −15.8235 | 0.4104 | | | | 69.4015 |
| S9 | Aspherical | 21.9957 | 0.3301 | 1.570 | 37.32 | −32.2009 | −98.8613 |
| S10 | Aspherical | 9.9546 | 0.5054 | | | | 12.8146 |
| S11 | Aspherical | 3.8004 | 0.5321 | 1.546 | 56.11 | 11.5018 | −0.4814 |
| S12 | Aspherical | 9.1524 | 1.5189 | | | | 5.2866 |
| S13 | Aspherical | −742.1196 | 0.9348 | 1.536 | 55.74 | −6.3645 | 98.9513 |
| S14 | Aspherical | 3.4336 | 0.5522 | | | | −7.3043 |
| S15 | Spherical | Infinite | 0.2142 | 1.517 | 64.17 | | |
| S16 | Spherical | Infinite | 0.1217 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −4.8343E−03 | −6.3787E−03 | −1.7815E−03 | −3.1739E−04 | −1.0926E−04 | −9.9696E−05 | −5.0761E−05 | −1.2334E−05 | 1.2690E−05 |
| S2 | −2.2155E−02 | 3.1900E−03 | −1.3346E−03 | 1.1470E−03 | −2.3276E−04 | −1.6660E−04 | −1.3889E−04 | −2.5553E−05 | −1.8940E−05 |
| S3 | 5.7315E−02 | 1.4010E−02 | −2.3196E−04 | 1.2078E−03 | −1.1943E−04 | −7.3621E−05 | −1.0358E−04 | −2.3568E−05 | −6.8731E−06 |
| S4 | 6.1768E−02 | 7.5512E−03 | −1.2459E−04 | 4.0409E−05 | −1.7823E−04 | −4.3500E−05 | −3.2418E−05 | −1.0880E−05 | −6.1502E−06 |
| S5 | −8.9474E−02 | 1.5031E−03 | 2.3108E−04 | −7.8914E−05 | −4.4483E−04 | −1.7490E−04 | −8.5680E−05 | −2.7825E−05 | −1.4354E−05 |
| S6 | −8.0391E−02 | 1.1247E−02 | 2.1929E−03 | 7.4101E−04 | −1.0843E−04 | −2.1680E−05 | 8.5759E−07 | 9.7236E−06 | 2.8783E−06 |
| S7 | −1.0086E−01 | 1.2657E−02 | 3.2889E−03 | 7.2288E−04 | −9.4783E−05 | −9.2735E−05 | 3.4921E−06 | 2.1997E−06 | 3.5022E−06 |
| S8 | −1.7941E−01 | −6.3656E−03 | 4.9062E−03 | 8.9906E−04 | 7.5427E−04 | 1.0844E−04 | 6.3580E−05 | 1.2930E−05 | 7.8352E−06 |
| S9 | −3.8270E−01 | −1.7236E−02 | 2.4546E−03 | −1.2155E−03 | −9.6627E−05 | −2.6437E−04 | −1.0372E−04 | −6.7668E−05 | −7.8151E−06 |
| S10 | −5.9344E−01 | 8.0876E−02 | −4.2866E−03 | −3.8398E−04 | −7.7424E−04 | 1.6741E−05 | −5.2503E−05 | −1.3233E−05 | 2.6303E−05 |
| S11 | −1.4681E+00 | 6.3552E−02 | −7.5484E−06 | 5.0193E−03 | 1.9695E−03 | 1.5990E−04 | −2.5132E−04 | −8.9360E−05 | −1.6083E−05 |
| S12 | −1.2586E+00 | 6.6537E−03 | −1.7014E−02 | −1.1501E−02 | 5.3585E−04 | −1.8240E−03 | 2.6030E−04 | −3.8321E−05 | −5.4478E−05 |
| S13 | −1.2643E+00 | 5.8850E−01 | −2.2710E−01 | 6.6943E−02 | −1.7977E−02 | 3.6907E−03 | −3.8749E−04 | −1.6707E−04 | 5.9537E−05 |
| S14 | −2.5369E+00 | 3.4495E−01 | −2.6865E−01 | 5.1046E−02 | −5.0179E−02 | 7.0458E−03 | −5.4110E−03 | 1.3452E−03 | −3.0565E−04 |

Figure 10A:
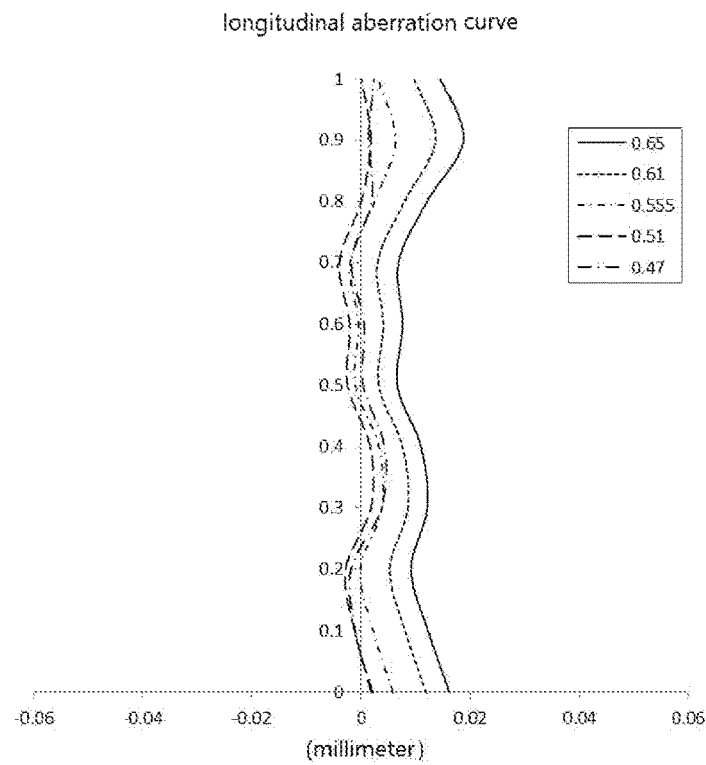
FIG. 10A to FIG. 10D show a longitudinal aberration curve, astigmatism curve, distortion curve and lateral color curve of an optical imaging lens according to embodiment 5 respectively.
Figure 10B:
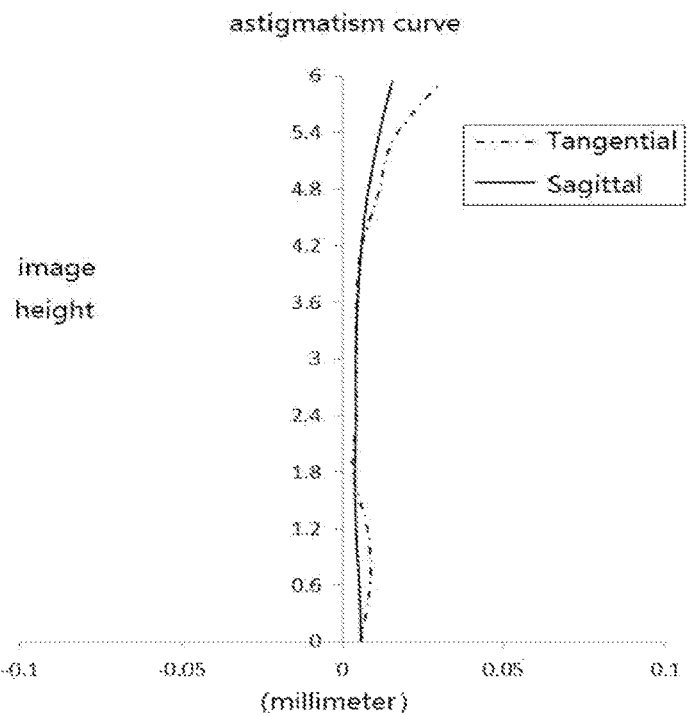
Figure 10C:
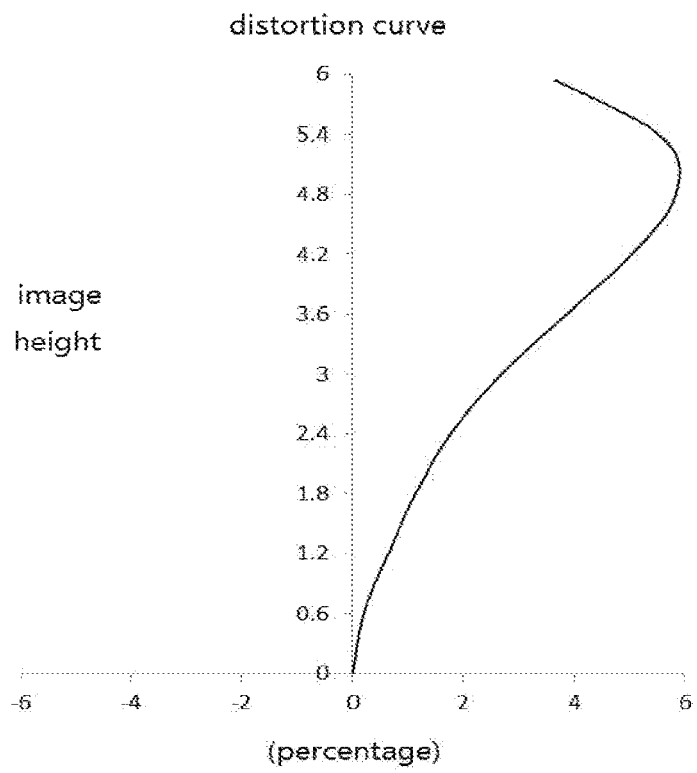
Figure 10D:
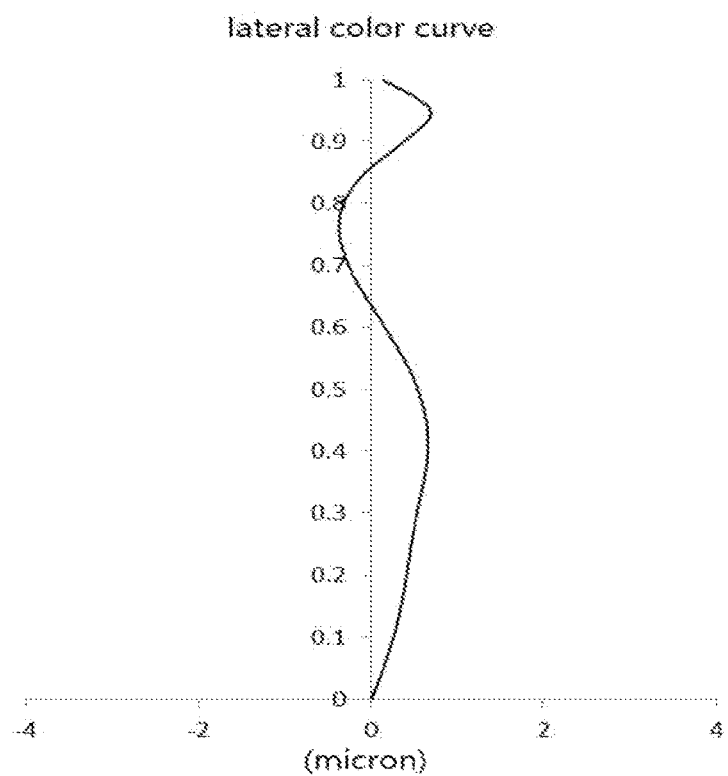

FIG. 10A shows a longitudinal aberration curve of the optical imaging lens according to embodiment 5 to represent deviation of a convergence focal point after light with different wavelengths passes through the lens. FIG. 10B shows an astigmatism curve of the optical imaging lens according to embodiment 5 to represent a meridian image surface curvature and a sagittal image surface curvature. FIG. 10C shows a distortion curve of the optical imaging lens according to embodiment 5 to represent distortion values corresponding to different image heights. FIG. 10D shows a lateral color curve of the optical imaging lens according to embodiment 5 to represent deviation of different image heights on the imaging surface after the light passes through the lens. According to FIG. 10A to FIG. 10D, it can be seen that the optical imaging lens provided in embodiment 5 may achieve high imaging quality.

Embodiment 6

Figure 11:
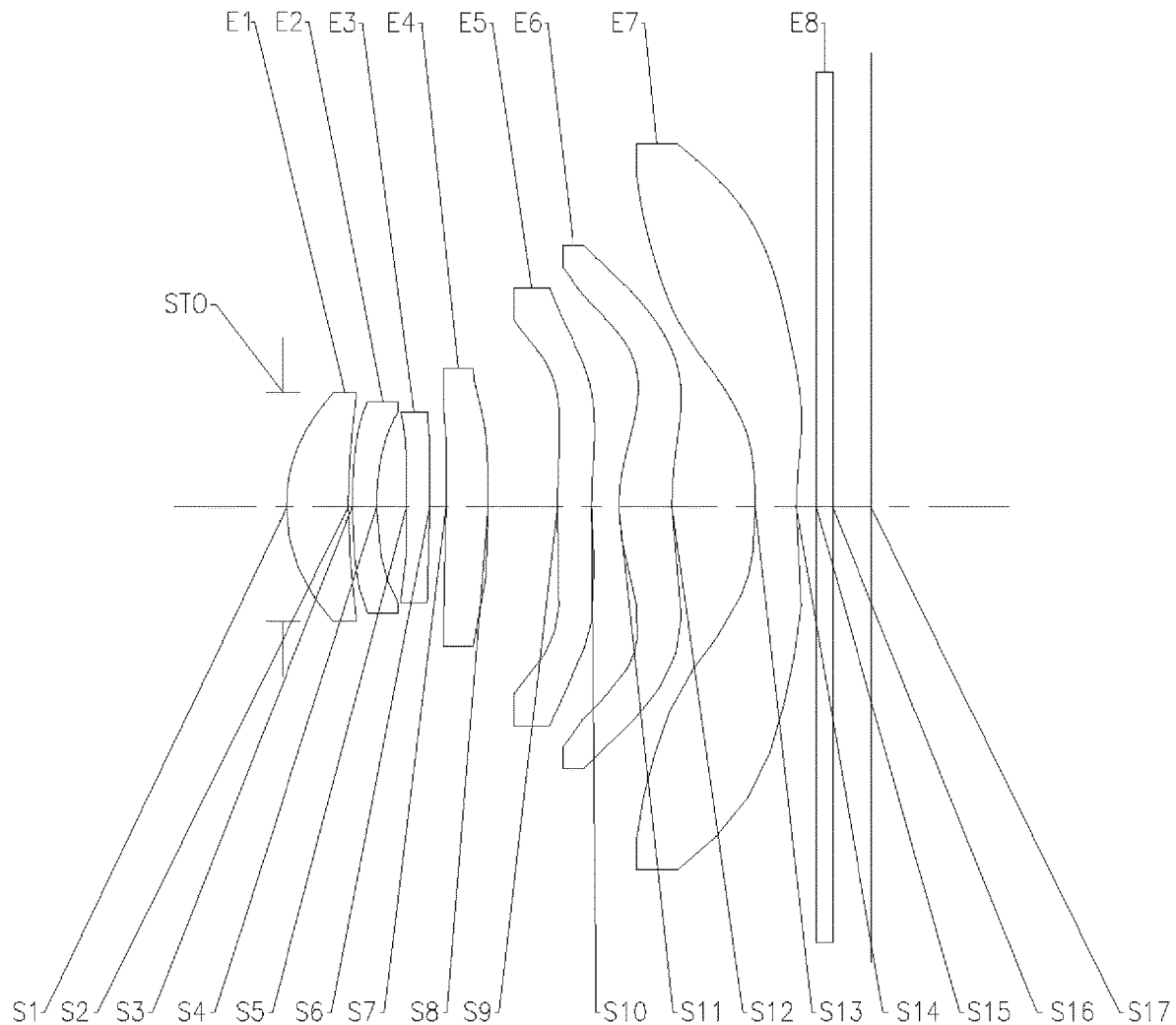
FIG. 11 shows a structure diagram of an optical imaging lens according to embodiment 6 of the disclosure.

An optical imaging lens according to embodiment 6 of the disclosure is described below with reference to FIG. 11 to FIG. 12D. FIG. 11 shows a structure diagram of an optical imaging lens according to embodiment 6 of the disclosure.

As shown in FIG. 11, the optical imaging lens sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8. The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a convex surface. The fifth lens E5 has negative refractive power, an object-side surface S9 thereof is a convex surface, while an image-side surface S10 is a concave surface. The sixth lens E6 has positive refractive power, an object-side surface S11 thereof is a convex surface, while an image-side surface S12 is a concave surface. The seventh lens E7 has negative refractive power, an object-side surface S13 thereof is a concave surface, while an image-side surface S14 is a concave surface. The optical filter E8 has an object-side surface S15 and an image-side surface S16. The optical imaging lens has an imaging surface S17. Light from an object sequentially penetrates through each of the surfaces S1 to S16 and is finally imaged on the imaging surface S17.

In embodiment 6, a value of a total effective focal length f of the optical imaging lens is 6.67 mm, and a value of a maximum FOV is 87.3°.

Table 11 is a basic parameter table of the optical imaging lens of embodiment 6, and units of the curvature radius, the thickness/distance and the focal length are all millimeter (mm). Table 12 shows high-order coefficients applied to each aspherical mirror surface in embodiment 6. A surface type of each aspherical surface may be defined by the formula (1) given in embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0500 | | | | |
| S1 | Aspherical | 2.3705 | 0.8047 | 1.546 | 56.11 | 5.62 | −0.0006 |
| S2 | Aspherical | 9.1759 | 0.0500 | | | | −2.5037 |
| S3 | Aspherical | 7.3677 | 0.3162 | 1.678 | 19.25 | −13.64 | −0.5179 |
| S4 | Aspherical | 4.0285 | 0.3881 | | | | 0.1239 |
| S5 | Aspherical | 126.2861 | 0.3009 | 1.678 | 19.25 | −58.01 | −99.0000 |
| S6 | Aspherical | 29.9460 | 0.2120 | | | | −93.6622 |
| S7 | Aspherical | 21.7871 | 0.5473 | 1.546 | 56.11 | 26.3681 | −17.8533 |
| S8 | Aspherical | −42.0379 | 0.9001 | | | | 85.7338 |
| S9 | Aspherical | 11.2524 | 0.4475 | 1.570 | 37.32 | −23.0288 | −4.0704 |
| S10 | Aspherical | 5.9731 | 0.3539 | | | | 0.2381 |
| S11 | Aspherical | 2.6551 | 0.6909 | 1.546 | 56.11 | 8.0369 | −1.0065 |
| S12 | Aspherical | 6.1071 | 1.0791 | | | | 0.0432 |
| S13 | Aspherical | −8.7666 | 0.5331 | 1.536 | 55.74 | −5.6493 | 0.2433 |
| S14 | Aspherical | 4.7344 | 0.2609 | | | | −2.2078 |
| S15 | Spherical | Infinite | 0.2142 | 1.517 | 64.17 | | |
| S16 | Spherical | Infinite | 0.5045 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −1.6043E−03 | −3.6625E−03 | −1.2048E−03 | −3.5502E−04 | −1.4368E−04 | −1.0168E−04 | −5.6183E−05 | −2.6891E−05 | −3.6429E−06 |
| S2 | −3.6922E−02 | 3.6125E−03 | −3.2599E−03 | 7.0241E−04 | 2.9143E−04 | 3.9134E−04 | 2.1800E−04 | 3.0768E−05 | −4.0174E−05 |
| S3 | 3.2313E−02 | 1.3806E−02 | −1.7616E−04 | 2.7382E−04 | −6.4105E−05 | −4.1033E−05 | 1.5240E−05 | 3.5282E−05 | 4.6157E−06 |
| S4 | 4.6138E−02 | 5.6414E−03 | 1.3295E−04 | −2.2280E−04 | −1.9763E−04 | −1.1499E−04 | −5.5445E−05 | −1.2122E−05 | −1.4695E−06 |
| S5 | −8.4418E−02 | −2.7392E−03 | 2.9715E−04 | −3.2430E−07 | −1.3819E−04 | −4.1597E−05 | −3.4637E−05 | −7.6232E−06 | −7.3518E−06 |
| S6 | −6.8643E−02 | 5.7766E−03 | 1.3501E−03 | 3.0515E−04 | −5.5900E−05 | 1.2984E−05 | −4.4912E−06 | 3.6624E−06 | −4.9259E−08 |
| S7 | −1.3278E−01 | 3.4134E−02 | 2.1064E−03 | −1.4374E−03 | −5.8275E−04 | 1.7429E−04 | 6.5251E−05 | −5.1137E−06 | −9.8905E−06 |
| S8 | −1.9895E−01 | 4.3805E−02 | 7.2696E−03 | −1.0711E−03 | −1.1447E−03 | −1.8057E−04 | 5.6313E−05 | 3.5140E−05 | 1.3814E−05 |
| S9 | −9.5761E−01 | 2.2797E−02 | 3.6925E−02 | 1.1705E−02 | −5.8446E−03 | −2.3570E−03 | −1.1833E−03 | −5.8011E−04 | −1.1895E−04 |
| S10 | −1.7126E+00 | 3.1878E−01 | −3.7188E−02 | 3.4855E−04 | −1.2246E−02 | 6.1044E−03 | −2.2558E−04 | −1.0764E−03 | −9.2428E−05 |
| S11 | −3.3991E+00 | 4.6144E−01 | 4.6821E−02 | −2.2690E−02 | −1.6448E−02 | 1.0630E−03 | 4.0272E−03 | −1.0231E−03 | −5.3930E−04 |
| S12 | −2.8095E+00 | 2.8113E−01 | 4.6492E−02 | −2.4031E−02 | 2.8482E−02 | −7.1988E−03 | −8.2583E−04 | −3.1581E−03 | 4.5245E−04 |
| S13 | −5.4547E−01 | 8.2255E−01 | −5.0249E−01 | 2.6344E−01 | −1.1796E−01 | 2.9079E−02 | 2.1803E−03 | −4.4063E−03 | 1.2476E−03 |
| S14 | −5.6104E+00 | 1.0089E+00 | −5.6924E−01 | 2.4290E−01 | −1.3137E−01 | 8.2791E−02 | 9.4579E−03 | 3.2380E−02 | 1.2757E−02 |

Figure 12A:
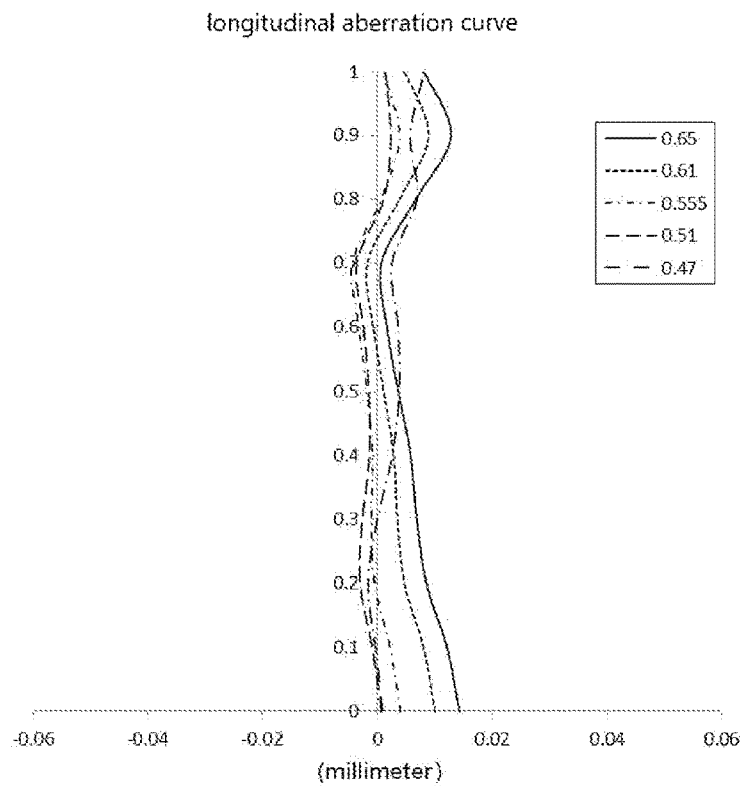
FIG. 12A to FIG. 12D show a longitudinal aberration curve, astigmatism curve, distortion curve and lateral color curve of an optical imaging lens according to embodiment 6 respectively.
Figure 12B:
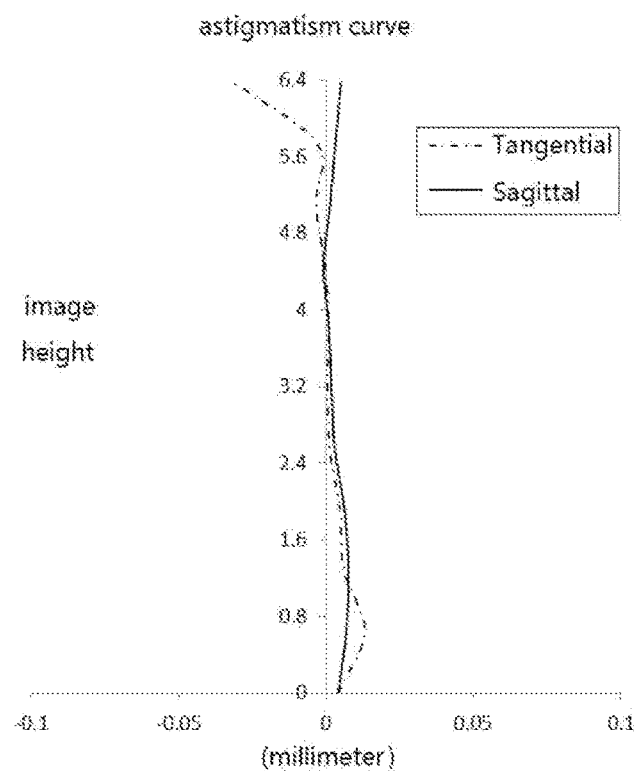
Figure 12C:
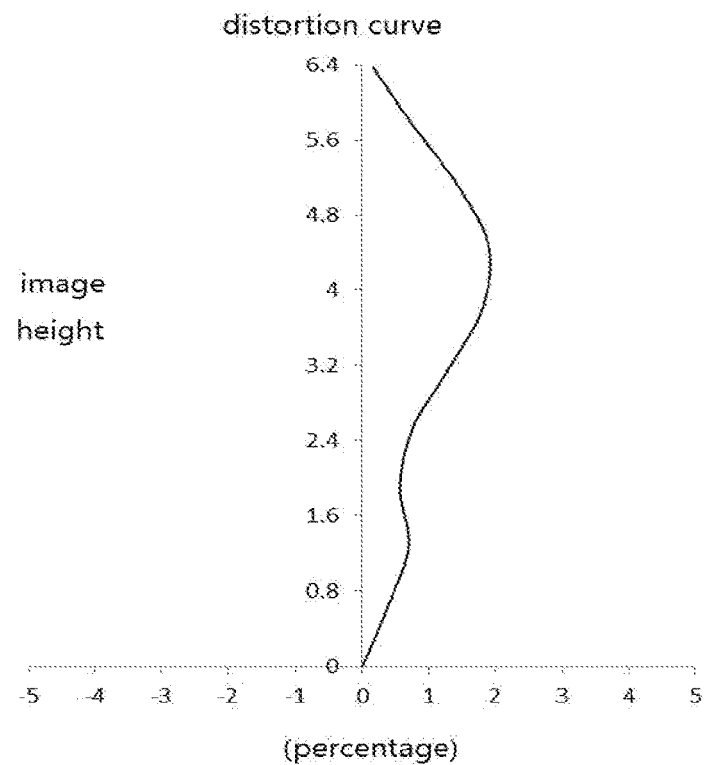
Figure 12D:
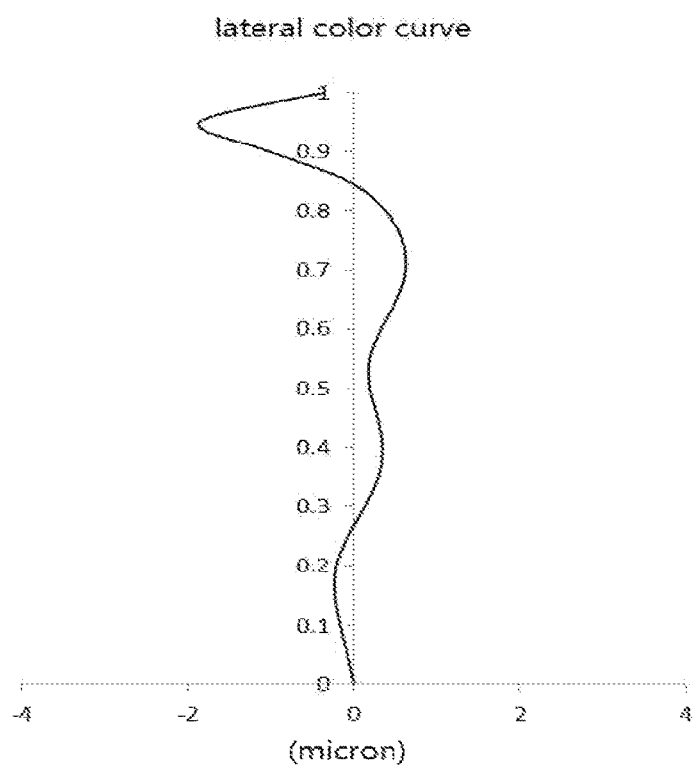

FIG. 12A shows a longitudinal aberration curve of the optical imaging lens according to embodiment 6 to represent deviation of a convergence focal point after light with different wavelengths passes through the lens. FIG. 12B shows an astigmatism curve of the optical imaging lens according to embodiment 6 to represent a meridian image surface curvature and a sagittal image surface curvature. FIG. 12C shows a distortion curve of the optical imaging lens according to embodiment 6 to represent distortion values corresponding to different image heights. FIG. 12D shows a lateral color curve of the optical imaging lens according to embodiment 6 to represent deviation of different image heights on the imaging surface after the light passes through the lens. According to FIG. 12A to FIG. 12D, it can be seen that the optical imaging lens provided in embodiment 6 may achieve high imaging quality.

From the above, embodiment 1 to embodiment 6 meet a relationship shown in Table 13 respectively.

TABLE 13

| Conditional expression/ embodiment | 1 | 2 | 3 | 4 | 5 | 6 |
|---|---|---|---|---|---|---|
| f × tan(FOV/2) | 6.31 | 6.34 | 6.49 | 6.37 | 5.73 | 6.36 |
| f4/f6 | 1.83 | 4.08 | 2.97 | 1.37 | 3.37 | 3.28 |
| f/CT6 | 12.64 | 9.83 | 9.07 | 10.95 | 12.68 | 9.65 |
| f/R8 | −1.05 | −0.58 | −0.60 | −0.40 | −0.43 | −0.16 |
| f/R5 | −0.72 | −0.55 | −0.14 | −0.03 | −0.07 | 0.05 |
| f/f1 | 1.29 | 1.22 | 1.18 | 1.12 | 1.24 | 1.19 |
| f2/f7 | 1.97 | 2.15 | 3.07 | 2.56 | 1.94 | 2.41 |
| f/|f3| + f/|f5| | 0.24 | 0.32 | 0.49 | 0.44 | 0.21 | 0.40 |
| (N4 + N5 + N6)/3 | 1.55 | 1.55 | 1.55 | 1.55 | 1.55 | 1.55 |
| V6 − V5 | 18.79 | 18.79 | 18.79 | 18.79 | 18.79 | 18.79 |
| f/(R2 − R1) | 0.62 | 0.66 | 0.81 | 0.91 | 0.55 | 0.98 |
| (R3 + R4)/ (R3 − R4) | 3.28 | 3.57 | 2.85 | 3.75 | 2.37 | 3.41 |
| f/R9 − f/R10 | −0.73 | −0.13 | −0.56 | −0.32 | −0.37 | −0.52 |
| R12/R11 | 1.00 | 0.92 | 3.57 | 2.26 | 2.41 | 2.30 |
| T34/T45 | 0.28 | 0.26 | 0.12 | 0.32 | 0.46 | 0.24 |
| T45/T56 | 0.80 | 2.67 | 2.05 | 0.75 | 0.81 | 2.54 |
| f/f2 | −0.54 | −0.54 | −0.42 | −0.40 | −0.55 | −0.49 |
| f/f7 | −1.06 | −1.17 | −1.28 | −1.03 | −1.06 | −1.18 |
| TTL/ImgH | 1.18 | 1.18 | 1.22 | 1.31 | 1.33 | 1.19 |

The disclosure also provides an imaging device, which is provided with an electronic photosensitive element for imaging. The electronic photosensitive element may be a CCD or a CMOS. The imaging device may be an independent imaging device such as a digital camera, and may also be an imaging module integrated into a mobile electronic device such as a mobile phone. The imaging device is provided with the abovementioned optical imaging lens.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging lens, sequentially comprising, from an object side to an image side along an optical axis, a first lens, a second lens, a third lens, a fourth lens, a fifth lens, a sixth lens and a seventh lens, wherein
the first lens has positive refractive power, the fourth lens has positive refractive power, and the seventh lens has negative refractive power;
a total effective focal length f of the optical imaging lens and a maximum Field Of View (FOV) of the optical imaging lens meet f×tan(FOV/2)≥5.5 mm; and
an effective focal length f4 of the fourth lens and an effective focal length f6 of the sixth lens meet 1.3≤f4/f6≤4.5;
a curvature radius R11 of an object-side surface of the sixth lens and a curvature radius R12 of an image-side surface of the sixth lens meet 0.95≤R12/R11<4.0.

2. The optical imaging lens according to claim 1, wherein the total effective focal length f of the optical imaging lens and a center thickness CT6 of the sixth lens on the optical axis meet 9≤f/CT6<15.

3. The optical imaging lens according to claim 1, wherein the total effective focal length f of the optical imaging lens and a curvature radius R8 of an image-side surface of the fourth lens meet −1.5<f/R8<0.

4. The optical imaging lens according to claim 1, wherein the total effective focal length f of the optical imaging lens and a curvature radius R5 of an object-side surface of the third lens meet −1.0<f/R5<0.1.

5. The optical imaging lens according to claim 1, wherein the total effective focal length f of the optical imaging lens and an effective focal length f1 of the first lens meet 1<f/f≤1.3.

6. The optical imaging lens according to claim 1, wherein an effective focal length f2 of the second lens and an effective focal length f7 of the seventh lens meet 1.5<f2/f7<3.2.

7. The optical imaging lens according to claim 1, wherein the total effective focal length f of the optical imaging lens, an effective focal length f3 of the third lens and an effective focal length f5 of the fifth lens meet 0.25≤f/|f3|+f/|f5|0.5.

8. The optical imaging lens according to claim 1, wherein a refractive index N4 of the fourth lens, a refractive index N5 of the fifth lens and a refractive index N6 of the sixth lens meet 1.5<(N4+N5+N6)/3≤1.6; and
an Abbe number V5 of the fifth lens and an Abbe number V6 of the sixth lens meet 15<V6−V5≤20.

9. The optical imaging lens according to claim 1, wherein the total effective focal length f of the optical imaging lens, a curvature radius R1 of the object-side surface of the first lens and a curvature radius R2 of an image-side surface of the first lens meet 0.5≤f/(R2−R1)≤1.0.

10. The optical imaging lens according to claim 1, wherein a curvature radius R3 of an object-side surface of the second lens and a curvature radius R4 of an image-side surface of the second lens meet 2.0<(R3+R4)/(R3−R4)<4.0.

11. The optical imaging lens according to claim 1, wherein the total effective focal length f of the optical imaging lens, a curvature radius R9 of an object-side surface of the fifth lens and a curvature radius R10 of an image-side surface of the fifth lens meet −1.0<f/R9−f/R10<0.

12. The optical imaging lens according to claim 1, wherein a separation distance T34 of the third lens and the fourth lens on the optical axis and a separation distance T45 of the fourth lens and the fifth lens on the optical axis meet T34/T45≤50.5; and
the separation distance T45 of the fourth lens and the fifth lens on the optical axis and a separation distance T56 of the fifth lens and the sixth lens on the optical axis meet 0.5<T45/T56<3.0.

13. The optical imaging lens according to claim 1, wherein the total effective focal length f of the optical imaging lens and the effective focal length f2 of the second lens meet $-0.6 \leq f/f2 \leq -0.4$.

14. The optical imaging lens according to claim 1, wherein the total effective focal length f of the optical imaging lens and the effective focal length f7 of the seventh lens meet $-1.3 \leq f/f7 \leq -1.0$.

15. The optical imaging lens according to claim 1, wherein TTL is a distance from an object-side surface of the first lens to an imaging surface of the optical imaging lens on the optical axis and ImgH is a half of a diagonal length of an effective pixel region on the imaging surface meet TTL/ImgH<1.5.

\* \* \* \* \*